United States Patent
Shidomi et al.

(10) Patent No.: US 10,270,136 B2
(45) Date of Patent: Apr. 23, 2019

(54) SEPARATOR FOR LEAD-ACID BATTERY, AND LEAD-ACID BATTERY

(71) Applicant: Nippon Sheet Glass Company, Limited, Tokyo (JP)

(72) Inventors: Takashi Shidomi, Tokyo (JP); Tadamasa Wada, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 71 days.

(21) Appl. No.: 15/516,487

(22) PCT Filed: Jul. 21, 2015

(86) PCT No.: PCT/JP2015/003651
§ 371 (c)(1),
(2) Date: Apr. 3, 2017

(87) PCT Pub. No.: WO2016/059739
PCT Pub. Date: Apr. 21, 2016

(65) Prior Publication Data
US 2018/0233783 A1 Aug. 16, 2018

(30) Foreign Application Priority Data
Oct. 15, 2014 (JP) .................................. 2014-210986

(51) Int. Cl.
| H01M 10/12 | (2006.01) |
| H01M 2/16 | (2006.01) |
| H01M 4/14 | (2006.01) |
| H01M 4/62 | (2006.01) |
| H01M 4/73 | (2006.01) |
| H01M 4/68 | (2006.01) |
| H01M 10/10 | (2006.01) |
| H01M 2/28 | (2006.01) |
| H01M 10/08 | (2006.01) |
| H01M 10/06 | (2006.01) |

(52) U.S. Cl.
CPC ......... H01M 10/125 (2013.01); H01M 2/166 (2013.01); H01M 2/28 (2013.01); H01M 4/14 (2013.01); H01M 4/627 (2013.01); H01M 4/68 (2013.01); H01M 4/73 (2013.01); H01M 10/06 (2013.01); H01M 10/08 (2013.01); H01M 10/10 (2013.01)

(58) Field of Classification Search
CPC .......... H01M 2/28; H01M 4/14; H01M 4/627; H01M 4/68; H01M 4/73; H01M 10/06; H01M 10/08; H01M 10/10; H01M 10/12–10/128
See application file for complete search history.

(56) References Cited

U.S. PATENT DOCUMENTS

| 2017/0104199 A1* | 4/2017 | Miller .................... H01M 2/18 |
| 2017/0133650 A1* | 5/2017 | Krishnamoorthy et al. ................ H01M 2/145 |
| 2017/0200984 A1* | 7/2017 | Mittal ................. H01M 2/1613 |
| 2018/0269451 A1* | 9/2018 | Krishnamoorthy ......................... H01M 2/1626 |

FOREIGN PATENT DOCUMENTS

| DE | 102010013295 A1 | 9/2011 |
| JP | 2002298816 A | 10/2002 |
| JP | 2004119160 A * | 4/2004 |
| JP | 2004119160 A | 4/2004 |

OTHER PUBLICATIONS

JP-2004119160-A English machine translation (Year: 2004).*
Extended European Search Report for corresponding European Patent Application No. 15850420.9, dated Apr. 23, 2018 (15 Sheets).

* cited by examiner

*Primary Examiner* — Scott J. Chmielecki
(74) *Attorney, Agent, or Firm* — Kratz, Quintos & Hanson, LLP

(57) ABSTRACT

To provide a convenient and effective method for suppressing the penetration of dendrite over the microporous film mainly containing the base portion, which occupies the most part of the entire separator (total area), rather than the peculiar concept (resulting in a difficult measure), in which only the pore structure of the rib portion is densified or contracted for suppressing dendrite from penetrating through the rib portion. A separator for a lead-acid battery, containing a microporous film obtained in such a manner that a raw material composition mainly containing a polyolefin resin, silica powder, and a plasticizer is melt-kneaded and formed into a film, from which the plasticizer is entirely or partially removed, the raw material composition containing glass flakes having an average particle diameter of from 20 to 800 μm and an average thickness of 0.2 to 8 μm and having no self-film formability in an amount of from 2 to 15% by weight based on a total amount of the silica powder and the glass flakes, the glass flakes in the microporous film being disposed in such a manner that a plane direction thereof is substantially oriented in a plane direction of the microporous film, a value of (the content of the glass flakes in the microporous film)/(the average thickness of the glass flakes in the microporous film) being 1 or more.

6 Claims, No Drawings

SEPARATOR FOR LEAD-ACID BATTERY, AND LEAD-ACID BATTERY

TECHNICAL FIELD

The present invention relates to a separator for a lead-acid battery, formed of a microporous film containing a polyolefin resin (mainly polyethylene), inorganic powder (mainly silica powder), a plasticizer (mainly a mineral oil), and various additives (such as a surfactant), and a lead-acid battery containing the separator.

BACKGROUND ART

As a separator for a lead-acid battery (particularly a liquid lead-acid battery), there has been a separator formed of a microporous film that generally contains from 20 to 60% by weight of a polyolefin resin having a weight average molecular weight of 500,000 or more (which is generally a super high molecular weight polyethylene), from 40 to 80% by weight of inorganic powder having a specific surface area of 50 m$^2$/g or more (which is generally silica fine powder), from 0 to 30% by weight of a plasticizer (which is generally a mineral oil), which also functions as a pore opening agent, from 0 to 10% by weight of a surfactant (solid content), and from 0 to 5% by weight of an additive (including an antioxidant, a weather stabilizer, and the like), which is referred to as a polyethylene separator.

The separator formed of a microporous film is generally a sheet having a base thickness of approximately from 0.1 to 0.3 mm, an average pore diameter (mercury intrusion method) of approximately from 0.01 to 0.5 μm, and a porosity (mercury intrusion method) of approximately from 50 to 90% by volume obtained in such a manner that a raw material composition obtained by mixing the polyolefin resin, the inorganic powder, the plasticizer (which is mixed in an amount that is larger than the aforementioned separator composition), the surfactant, and the additive is heated, melted and kneaded, and simultaneously extruded into a sheet, and rolled to a prescribed thickness, from which the plasticizer is entirely or partially removed by extraction.

In recent years, in a liquid lead-acid battery using the separator formed of a microporous film, a penetration short circuit (dendrite short circuit) phenomenon is becoming a problem, in which dendrite (i.e., a dendritic deposition of lead) penetrates through the separator in the thickness direction to connect the positive and negative electrodes, resulting in short circuit. The penetration short circuit phenomenon is such a phenomenon that is accelerated by getting the sulfuric acid electrolytic solution close to neutral due to over discharge of the battery. The background thereof includes the particular use conditions of the battery, such as an automobile with a charge controlling system and an automobile with a start-stop system, which are the recent specifications of automobiles, and the battery is generally in a use environment, in which charge and discharge are repeated without full charge, and tends to be in a rather discharged state. Accordingly, while the "agitation effect of the electrolytic solution through gassing occurring in the over charged state", which is naturally counted in the ordinary automobile battery (i.e., a liquid lead-acid battery), cannot be expected, the stratification phenomenon of the electrolytic solution (i.e., the phenomenon, in which sulfuric acid having a high specific gravity formed on the electrode in charging moves to the lower part of the battery, causing a difference in concentration of the electrolytic solution in the vertical direction of the battery) tends to occur, and in the upper part of the battery, in which the stratification phenomenon occurs, the formation and growth of dendrite is accelerated under the use environment of a rather discharged state, due to the low concentration of the electrolytic solution, and the separator formed of a microporous film that is said to have an average pore diameter of approximately from 0.01 to 0.5 μm is said to undergo a dendrite short circuit penetrating through the separator.

Patent Document 1 proposes that in a separator for a liquid lead-acid battery, formed of a ribbed microporous film having a rib for contacting an electrode, protruding on one surface of a flat sheet, assuming that the ribbed microporous film is distinguished into a rib portion and a base portion, the porosity, the average pore diameter, and the maximum pore diameter of the rib portion are made smaller by 0.8 time or less, or the surface opening ratio thereof is made smaller by 0.8 time or less, than the base portion, thereby preventing dendrite from penetrating through the rib for contacting an electrode, and consequently a dendrite short circuit is suppressed from occurring in the separator formed of a ribbed microporous film.

CITATION LIST

Patent Documents

Patent Document 1: JP-A-2013-211115

SUMMARY OF INVENTION

Technical Problem

However, the technique of Patent Document 1 is of a concept mainly aiming to suppress the penetration of dendrite in the rib portion, in which only the pore structure of the rib portion corresponding only to a small portion of the entire separator (total area) is necessarily densified or contracted, which may results in complication of the production process or increase of the difficulty of production.

Accordingly, an object of the invention is to aim mainly to suppress the penetration of dendrite in the base portion, which occupies the most part of the entire separator (total area), rather than the peculiar concept (resulting in a difficult measure), in which only the pore structure of the rib portion is densified or contracted for suppressing dendrite from penetrating through the rib portion.

Solution to Problem

In the invention, in view of the object, for suppressing the penetration of dendrite (i.e., for preventing or retarding the penetration of dendrite) in the base portion having a thickness of from 0.1 to 0.3 mm of the separator formed of a microporous film, in the pore structure (pore pathway) of the base portion, which is the ordinary pore structure (pore pathway) of the film obtained by melt-forming a material mainly containing a polyolefin resin, silica powder, and a plasticizer, from which the plasticizer is removed, the pore structure (pore pathway) is demanded to be complicated (to be amaze or a diversion) as much as possible to elongate the growth pathway of dendrite while preventing the pore structure (pore pathway) from being clogged (for preventing the obstruction of the flow of the ions of the electrolytic solution, which may increase the electric resistance). Accordingly, in the three-dimensional network structure, which is the ordinary pore structure (pore pathway) of the film obtained by melt-forming a material mainly containing a polyolefin resin, silica powder, and a plasticizer, from which the plasticizer is removed, it is ideal that an obstacle capable of becoming a physical obstacle in the pathway in the thickness direction can be disposed uniformly in the microporous film. Furthermore, the obstacle is to be disposed in the ordinary pore structure (pore pathway) of the microporous film, and therefore the way of disposition of the obstacle and the amount of the obstacle disposed are demanded to be devised as much as possible, for preventing the electric resistance of the microporous film from being deteriorated.

Accordingly, as described in claim 1, the separator for a lead-acid battery of the invention is a separator for a lead-acid battery, comprising a microporous film having a base thickness of from 0.1 to 0.3 mm, an average pore diameter (mercury intrusion method) of from 0.01 to 0.5 µm, a maximum pore diameter (mercury intrusion method) of from 0.3 to 1.0 µm, and a porosity (mercury intrusion method) of from 50 to 90% by volume, obtained in such a manner that a raw material composition mainly containing a polyolefin resin, silica powder, and a plasticizer is melt-kneaded and formed into a film, from which the plasticizer is entirely or partially removed, the raw material composition further containing glass flakes having an average particle diameter of from 20 to 800 µm and an average thickness of 0.2 to 8 µm and having no self-film formability in an amount of from 2 to 15% by weight based on a total amount of the silica powder and the glass flakes, and a silane coupling agent (solid content) in a content of from 0 to 3% by weight, the microporous film having a total content of the polyolefin resin, the silica powder, the plasticizer, and the glass flakes of 90% by weight or more, a content of the polyolefin resin of from 20 to 60% by weight, a content of the silica powder of from 40 to 80% by weight, and a content of the plasticizer of from 0 to 30% by weight, and an amount of the glass flakes therein being from 2 to 15% by weight based on a total amount of the silica powder and the glass flakes, the glass flakes in the microporous film having an average thickness of from 0.2 to 8 µm, particles that have a particle diameter of 10 µm or more of the glass flakes in the microporous film having an average particle diameter of 20 µm or more and being disposed in such a manner that a plane direction thereof is substantially oriented in a plane direction of the microporous film, a value of (the content of the glass flakes in the microporous film (% by weight))/(the average thickness of the glass flakes in the microporous film (µm)) being 1 or more.

The separator for a lead-acid battery described in claim 2 is the separator for a lead-acid battery according to claim 1, wherein the value of (the content of the glass flakes in the microporous film (% by weight))/(the average thickness of the glass flakes in the microporous film (µm)) is 2 or more.

The separator for a lead-acid battery described in claim 3 is the separator for a lead-acid battery according to claim 1 or 2, wherein 80% or more of the particles that have a particle diameter of 10 µm or more of the glass flakes in the microporous film are disposed in such a manner that a plane direction thereof forms 20° or less with respect to the plane direction of the microporous film.

The separator for a lead-acid battery described in claim 4 is the separator for a lead-acid battery according to any one of claims 1 to 3, wherein the raw material composition contains the silane coupling agent (solid content) in a content of from 0.1% by weight or more.

The separator for a lead-acid battery described in claim 5 is the separator for a lead-acid battery according to any one of claims 1 to 4, wherein the glass flakes in the raw material composition and the microporous film have an average thickness of 2 µm or less, the amount of the glass flakes in the raw material composition is from 2 to 8% by weight based on the total amount of the silica powder and the glass flakes, the amount of the glass flakes in the microporous film is from 2 to 8% by weight based on the total amount of the silica powder and the glass flakes, and the value of (the content of the glass flakes in the microporous film (% by weight))/(the average thickness of the glass flakes in the microporous film (µm)) is 10 or less.

Furthermore, as described in claim 6, the lead-acid battery of the invention contains the separator according to any one of claims 1 to 5.

Advantageous Effects of Invention

According to the invention, there is provided, as a convenient and effective method, a method for suppressing the penetration of dendrite over the microporous film mainly containing the base portion, which occupies the most part of the entire separator (total area), rather than the peculiar concept (resulting in a difficult measure), in which only the pore structure of the rib portion is densified or contracted for suppressing dendrite from penetrating through the rib portion.

DESCRIPTION OF EMBODIMENTS

The microporous film constituting the separator for a lead-acid battery of the invention is basically a microporous film having a base thickness of from 0.1 to 0.3 mm, an average pore diameter (mercury intrusion method) of from 0.01 to 0.5 µm, a maximum pore diameter (mercury intrusion method) of from 0.3 to 1.0 µm, and a porosity (mercury intrusion method) of from 50 to 90% by volume, obtained in such a manner that a raw material composition mainly containing a polyolefin resin, silica powder, and a plasticizer is melt-kneaded and formed into a film, from which the plasticizer is entirely or partially removed.

The base thickness means, for example in the case where the microporous film has a rib protrusion, a term that is used for distinguishing from the total thickness including the rib protrusion, and the thickness except for the height of the rib protrusion (i.e., the thickness in the case where the rib protrusion is not provided). In the case where the ribbed microporous film is cut in the direction perpendicular to the film plane at the boundary between the flat sheet and the rib for contacting an electrode (i.e., the base line of the rib), the portion that includes the rib for contacting an electrode is referred to as a rib portion, and the portion that does not include the rib for contacting an electrode is referred to as a base portion. The raw material composition means a composition that contains all the raw materials subjected to the melt-kneading process, and means (a composition of) "all the raw materials", but does not means specifically a raw material mixture or a melt-kneaded material.

The raw material composition further necessarily contains glass flakes having an average particle diameter of from 20 to 800 µm and an average thickness of 0.2 to 8 µm and having no self-film formability in an amount of from 2 to 15% by weight based on a total amount of the silica powder and the glass flakes, and a silane coupling agent (solid content) in a content of from 0 to 3% by weight. The particle diameter of the glass flakes is defined as the square root of the area of the primary particles of the glass flakes in planar view. The self-film formability means such a property that in the case where only the glass flakes are dispersed in water to form a dispersion liquid having an appropriate concentration, which is coated on a surface of an appropriate base material having smoothness (for example, a metal flat plate or the like that is difficult to impregnate with the dispersion liquid) and then solidified by drying, the glass flakes form a film by themselves.

Furthermore, the microporous film necessarily has a total content of the polyolefin resin, the silica powder, the plasticizer, and the glass flakes of 90% by weight or more, a content of the polyolefin resin of from 20 to 60% by weight, a content of the silica powder of from 40 to 80% by weight, and a content of the plasticizer of from 0 to 30% by weight, and the amount of the glass flakes is necessarily from 2 to 15% by weight based on a total amount of the silica powder and the glass flakes.

The glass flakes in the microporous film necessarily have an average thickness of from 0.2 to 8 µm, particles that have a particle diameter of 10 µm or more of the glass flakes in the microporous film necessarily have an average particle diameter of 20 µm or more and are necessarily disposed in such a manner that the plane direction thereof is substantially oriented in the plane direction of the microporous film, and the value of (the content of the glass flakes in the microporous film (% by weight))/(the average thickness of the glass flakes in the microporous film (µm)) is necessarily 1 or more. The value of (the content of the glass flakes in the microporous film (% by weight))/(the average thickness of the glass flakes in the microporous film (µm)) is preferably 2 or more.

The glass flakes are the material that is contained in the separator formed of a microporous film of the invention, as an unnecessary obstacle as described above, and therefore the amount thereof contained is to be decreased as much as possible, whereas the pore structure (pore pathway) of the microporous film in the thickness direction is to be complicated (to be a diversion) as much as possible without clogging the pore pathway, for which the glass flakes have an extremely planar shape having a large average particle diameter of 20 µm or more (preferably 40 µm or more, more preferably 60 µm or more, further preferably 80 µm or more, and still further preferably 100 µm or more) and a small average thickness of 8 µm or less (preferably 6 µm or less, more preferably 4 µm or less, and further preferably 2 µm or less), and are disposed in such a manner that the particles that have a particle diameter of 10 µm or more thereof in the microporous film necessarily are disposed in such a manner that the plane direction thereof is substantially oriented in the plane direction of the microporous film. As for the orientation of the glass flakes, 80% or more of the particles that have a particle diameter of 10 µm or more of the glass flakes in the microporous film are preferably disposed in such a manner that the plane direction thereof forms 20° or less with respect to the plane direction of the microporous film, 90% or more of the particles that have a particle diameter of 10 µm or more of the glass flakes in the microporous film are more preferably disposed in such a manner that the plane direction thereof forms 20° or less with respect to the plane direction of the microporous film, and 95% or more of the particles that have a particle diameter of 10 µm or more of the glass flakes in the microporous film are further preferably disposed in such a manner that the plane direction thereof forms 20° or less with respect to the plane direction of the microporous film. Furthermore, 80% or more of the particles that have a particle diameter of 10 µm or more of the glass flakes in the microporous film are preferably disposed in such a manner that the plane direction thereof forms 10° or less with respect to the plane direction of the microporous film, 90% or more of the particles that have a particle diameter of 10 µm or more of the glass flakes in the microporous film are more preferably disposed in such a manner that the plane direction thereof forms 10° or less with respect to the plane direction of the microporous film, and 95% or more of the particles that have a particle diameter of 10 µm or more of the glass flakes in the microporous film are further preferably disposed in such a manner that the plane direction thereof forms 10° or less with respect to the plane direction of the microporous film. For decreasing the minimum necessary amount of the glass flakes for exhibiting the sufficient dendrite short circuit preventing effect as much as possible and suppressing the deterioration of the electric resistance as much as possible, the glass flakes are dispersed uniformly as much as possible in the microporous film. For example, in the case where the glass flakes are disposed in the microporous film with poor dispersion uniformity, a portion having a low packing density of the glass flakes may be formed locally, which consequently provokes dendrite short circuit to cause the end of lifetime of the battery due to dendrite short circuit. Even in the case where the glass flakes are disposed in the microporous film with poor dispersion uniformity, the portion having a low packing density of the glass flakes may be prevented from occurring by increasing the content of the glass flake, so as to prevent dendrite short circuit from occurring, but the electric resistance may be largely deteriorated.

Due to the background that the change of the use environment of the automobile battery in recent years makes a lead-acid battery to be used in a rather discharged state, resulting in a battery environment where formation and growth of dendrite tends to occur, a separator formed of a microporous film having a fine pore structure having an average pore diameter of from 0.01 to 0.5 µm is being in the state where dendrite short circuit, which is considered to have not occurred, is capable of occurring (i.e., dendrite is capable of penetrating through a fine pore pathway of from 0.01 to 0.5 µm). The actual dendrite short circuit in the separator formed of a microporous film is such a phenomenon that dendrite penetrates through the fine pore pathway having an average pore diameter of from 0.01 to 0.5 µm (i.e., conduction), and in view of the facts confirmed in the actual experiment using test batteries, the series of phenomena of from the formation and growth of dendrite to the end of lifetime of the battery can be estimated as follows. In the observation of the short circuit positions of the separator by breaking down the used battery that is considered to reach the end of lifetime due to dendrite short circuit in the separator, brown points showing the short circuit positions often cannot be confirmed, as being different from the ordinary short circuit phenomenon, which is caused, for example, by opening a hole in a separator. The dendrite short circuit phenomenon is such a phenomenon, as described above, that dendrite as a dendritic deposition of lead penetrates through a separator in the thickness direction thereof to connect the positive and negative electrodes (i.e., conduction) resulting in short circuit, but the first conduction due to dendrite at the first position does not immediately cause the end of lifetime of the battery. Specifically, the dendrite that just causes the first conduction does not form a firm connection body formed by completely connecting the entire dendrite (i.e., the entire length thereof), but is in a state of only an unstable connection body, which is in a level where "the dendrite is incidentally connected for a moment". Accordingly, immediately after the dendrite in the first position incidentally causes the first conduction, the conduction state is broken to restore the non-conduction state. The phenomena are being repeated. During the repetition of the phenomena, the conduction of dendrite starts to occur in the second position, the third position, the fourth position, and so on. Consequently, the number of the positions experiencing the conduction is increased, and the rotation of the plural conduction positions of dendrite eventually establishes the state where "the dendrite in any of the positions is in the conduction state", which actually brings about the end of lifetime of the battery. Even if dendrite short circuit occurs in the first position (i.e., only one position of dendrite short circuit), the end of lifetime of the battery does not occur thereby, but there is a tendency that the end of lifetime of the battery occurs in the case where plural positions in the separator simultaneously (or sequentially) undergo the dendrite short circuit. Accordingly, as a certain directionality, in the case where glass flakes having a large particle diameter and a small thickness as an obstacle can be dispersed in the microporous film in such a manner that the plane direction thereof is oriented to the plane direction of the microporous film, a sufficient effect (i.e., a clear effect with reproducibility) can be realized with an extremely small amount of the glass flakes.

When the average particle diameter of the glass flakes as a raw material exceeds 800 µm, the dispersion uniformity of the glass flakes in the microporous film tends to be deteriorated to prevent the dendrite short circuit preventing effect from being enhanced, and when the average particle diameter thereof is less than 20 µm, the pore pathway may be difficult to be complicated (to be a diversion), thereby failing to exhibit the dendrite short circuit preventing effect sufficiently. Accordingly, the average particle diameter of the glass flakes as a raw material is preferably 600 µm or less, more preferably 400 µm or less, and further preferably 200 µm or less, and is preferably 40 µm or more, more preferably 60 µm or more, further preferably 80 µm or more, and still further preferably 100 µm or more. In the case where the average particle diameter of the glass flakes as a raw material is too large, the high dispersion uniformity of the glass flakes may be obtained without problem in the step of preparing the raw material mixture making the raw materials close to a uniformly dispersed state by mixing and agitating the prescribed amounts of the raw materials with a special mixing device, but in the subsequent melt-kneading and film-forming steps, the glass flakes tend to be pulverized (even though the particles are in the uniformly dispersed state before pulverization, the respective particles are pulverized), and from the viewpoint of the particles thus pulverized, (the entire uniformly dispersed state is lost due to the localization of the particles, and) the dispersion uniformity of the glass flakes in the microporous film tends to be deteriorated. When the average diameter of the particles of the glass flakes that have a particle diameter of 10 µm or more in the microporous film is less than 20 µm, the pore pathway may be difficult to be complicated (to be a diversion), thereby failing to exhibit the dendrite short circuit preventing effect sufficiently. Accordingly, the average diameter of the particles of the glass flakes that have a particle diameter of 10 µm or more in the microporous film is preferably 40 µm or more, more preferably 60 µm or more, further preferably 80 µm or more, and still further preferably 100 µm or more.

The thickness of the glass flakes in the state of a raw material is basically not different from the thickness thereof contained in the microporous film. When the thickness of the glass flakes exceeds 8 µm, the minimum amount of the glass flakes that is necessary for exhibiting the sufficient dendrite short circuit preventing effect is increased, and thereby the electric resistance tends to be deteriorated. The glass flakes are in the position of a raw material that is used by replacing a part of the silica powder, which is originally used as inorganic powder as one of the major raw materials constituting the microporous film, and therefore the increase of the content of the glass flakes decreases the content of the silica powder since the idea concerning the content of the (entire) inorganic powder including the silica powder and the glass flakes is not changed from the ordinary techniques. The silica powder is formed of secondary particles formed through aggregation of fine primary particles, and the secondary particles each have a fine porous structure, through which the ions of the electrolytic solution can pass. Accordingly, even though the silica powder is present in the pores forming continuous pores in the microporous film, the flow of the ion of the electrolytic solution may not be obstructed, and the electric resistance may not be deteriorated. On the other hand, the glass flakes generally do not have an aggregated structure like the silica powder or a laminated structure like mica, but are in the state of primary particles without a (fine) porous structure like the silica powder for each of the particles, and therefore the ions of the electrolytic solution cannot pass through the particles. Accordingly, when the glass flakes are present in the pores forming continuous pores in the microporous film, the flow of the ion of the electrolytic solution tends to be obstructed, and the electric resistance tends to be deteriorated. Therefore, in the case where the content of the glass flakes is increased while retaining the (total) content of the inorganic powder, the content of the silica powder is decreased thereby, and the deterioration of the electric resistance tends to be conspicuous. Accordingly, the average thickness of the glass flakes is preferably 6 µm or less, more preferably 4 µm or less, and further preferably 2 µm or less. When the average thickness of the glass flakes is less than 0.2 µm, the material cost may be increased, and furthermore the glass flakes tend to be pulverized in the process of melt-kneading the raw material composition containing the glass flakes and forming into a film, which may deteriorate the dispersion uniformity of the glass flakes in the microporous film, so as to prevent the dendrite short circuit preventing effect from being enhanced. Accordingly, the average thickness of the glass flakes is preferably 0.4 µm or more, more preferably 0.6 µm or more, and further preferably 0.8 µm or more.

The glass flakes have the object of providing the function as an obstacle complicating (making a diversion) the pore structure (pore pathway) of the microporous film in the thickness direction without clogging the pore pathway, as described above, and therefore the glass flakes are disposed in such a manner that the plane direction thereof is substantially oriented in the plane direction of the microporous film as much as possible. When the glass flakes as a raw material have an average particle diameter of from 20 to 800 µm, the glass flakes in the melt-kneaded material tend to be oriented in the plane direction of a film in the subsequent process of forming into a film having a thickness of from 0.1 to 0.3 mm (i.e., the extruding and rolling steps), and thus in the microporous film, the plane direction of the glass flakes also tends to be substantially oriented in the plane direction of the microporous film. When the average particle diameter of the glass flakes as a raw material is less than 20 µm, however, the plane direction thereof may be prevented from being substantially oriented to the plane direction of the microporous film. Accordingly, the average particle diameter of the glass flakes as a raw material is preferably 40 µm or more, more preferably 60 µm or more, further preferably 80 µm or more, and still further preferably 100 μm or more. When the glass flakes as a raw material have an average thickness of from 0.2 to 8 μm, the glass flakes in the melt-kneaded material tend to be oriented in the plane direction of a film in the subsequent process of forming into a film having a thickness of from 0.1 to 0.3 mm (i.e., the extruding and rolling steps), and thus in the microporous film, the plane direction of the glass flakes also tends to be substantially oriented in the plane direction of the microporous film. When the average thickness of the glass flakes exceeds 8 μm, however, the plane direction thereof may be prevented from being substantially oriented to the plane direction of the microporous film. Accordingly, the average thickness of the glass flakes as a raw material is preferably 6 μm or less, more preferably 4 μm or less, and further preferably 2 μm or less.

As described above, the glass flakes are dispersed in the microporous film uniformly as much as possible, so as to exhibit the dendrite short circuit preventing effect with high efficiency, and thus contribute to the suppression of the deterioration of the electric resistance to a low level. Mica, which is a flaky or planar inorganic material similarly having a large particle diameter and a small thickness, has self-film formability (i.e., the primary particles thereof are deflocculated and dispersed in water or a liquid but are solidified in the form of a layer by drying), but the glass flakes in the invention do not have the self-film formability. Thus, the glass flakes (primary particles) in the invention are of such a nature that the glass flakes are present in a dispersed state without aggregation in water or a liquid, and are present in a dispersed state without aggregation even after drying. Accordingly, in the case where the glass flakes in the invention are melt-kneaded with the polyolefin resin, the silica powder, the plasticizer, and the like, the glass flakes (primary particles) are present in a dispersed state without aggregation, and thus even in the sheet after the film formation, the glass flakes (primary particles) are present in a dispersed state without aggregation.

In the invention, however, the portion that locally has a low packing density of the glass flakes, which extend linearly in (or penetrate through) the microporous film in the thickness direction thereof (i.e., the direction perpendicular to the film plane), is demanded to be prevented from increasing as much as possible, for suppressing the phenomenon that dendrite short circuit occurs simultaneously at plural positions in the separator to make the battery to reach the end of lifetime thereof, whereas the deterioration of the electric resistance due to the glass flakes filled therein is also demanded to be suppressed to the minimum level, and therefore the optimum and effective disposition of the obstacle in the microporous film is demanded, and the glass flakes are demanded to have high dispersion uniformity. For the enhancement of the dispersion uniformity of the glass flakes, a silane coupling agent is added to the raw material composition in a content of from 0 to 3% by weight (solid content). What is suggested by 0% by weight is that in the case where the target dispersion uniformity can be substantially obtained without the addition of a silane coupling agent, it is not necessary to add a silane coupling agent, which also has disadvantages (for example, the silane coupling agent has a significantly high material cost and lowers the hydrophilicity of the silica powder).

The silane coupling agent has a function of adhering a surface of an inorganic material and a surface of an organic material to each other, and thus in the process of producing the mixture (raw material mixture) of the raw material composition and in the process of melt-kneading the raw material composition, the particles of the glass flakes each are in the state where the particle is adhered to the surface of the polyolefin resin, and when the melt-kneading is performed uniformly, the glass flakes are dispersed with high dispersion uniformity in the melt-kneaded material or the sheet after the film formation (except for the case where the condition in the melt-kneading and film-forming process after producing the raw material mixture is such a condition that tends to pulverize the glass flakes). The silane coupling agent (solid content) is preferably contained in the raw material composition in a content of from 0.1 to 3% by weight. When the content of the silane coupling agent (solid content) in the raw material composition is 0.1% by weight or more, the effect of enhancing the dispersion uniformity of the glass flakes in the microporous film tends to be exhibited, but when the content thereof exceeds 3% by weight, the surface modification function, in which the silane coupling agent modifies the hydrophilic group (i.e., the -OH group) on the surface of the silica powder in the raw material composition, tends to be exhibited to lower the hydrophilicity of the silica powder, and thereby the hydrophilicity of the separator formed of the microporous film (i.e., the wettability to a sulfuric acid electrolytic solution) may be lowered, which may be a factor deteriorating the electric resistance in the initial stage. Accordingly, the content of the silane coupling agent (solid content) in the raw material composition is preferably 2% by weight or less, and more preferably 1% by weight or less.

The glass flakes are used based on the aforementioned conditions, and the necessary amount thereof is from 2 to 15% by weight based on the total amount of the silica powder and the glass flakes in the raw material composition, and from 2 to 15% by weight based on the total amount of the silica powder and the glass flakes in the microporous film, as described above. In both the cases, when the amount of the glass flakes is less than 2% by weight based on the total amount of the silica powder and the glass flakes, the dendrite short circuit preventing effect may not be sufficiently obtained (i.e., the certainty of the dendrite short circuit preventing effect may be lowered), and when the amount thereof exceeds 15% by weight, the electric resistance tends to be deteriorated. The glass flakes are in the position of a raw material that is used by replacing a part of the silica powder, which is originally used as inorganic powder as one of the major raw materials constituting the microporous film, and therefore the increase of the content of the glass flakes decreases the content of the silica powder since the idea concerning the content of the (entire) inorganic powder including the silica powder and the glass flakes is not changed from the ordinary techniques. The silica powder is formed of secondary particles formed through aggregation of fine primary particles, and the secondary particles each have a fine porous structure, through which the ions of the electrolytic solution can pass. Accordingly, even though the silica powder is present in the pores forming continuous pores in the microporous film, the flow of the ion of the electrolytic solution may not be obstructed, and the electric resistance may not be deteriorated. On the other hand, the glass flakes generally do not have an aggregated structure like the silica powder or a laminated structure like mica, but are in the state of primary particles without a (fine) porous structure like the silica powder for each of the particles, and therefore the ions of the electrolytic solution cannot pass through the particles. Accordingly, when the glass flakes are present in the pores forming continuous pores in the microporous film, the flow of the ion of the electrolytic solution tends to be obstructed, and the electric resistance tends to be deteriorated. Therefore, in the case where the content of the glass flakes is increased while retaining the (total) content of the inorganic powder, the content of the silica powder is decreased thereby, and the deterioration of the electric resistance tends to be conspicuous. Accordingly, it is preferred that the average thickness of the glass flakes is 2 μm or less in both the raw material composition and the microporous film, the amount of the glass flakes is from 2 to 8% by weight based on the total amount of the silica powder and the glass flakes in the raw material composition, and is from 2 to 8% by weight based on the total amount of the silica powder and the glass flakes in the microporous film, and the value of (the content of the glass flakes in the microporous film (% by weight))/(the average thickness of the glass flakes in the microporous film (μm)) is 10 or less.

Examples of a flaky or planar inorganic material having no self-film formability include alumina and boehmite, in addition to the glass flakes in the invention. However, the natural materials may contain impurities, such as iron and magnesium, which may have a possibility adversely affecting the battery. Furthermore, alumina and the like are materials that are considerably expensive as compared to glass, and such expensive materials cannot be used in a lead-acid battery, the characteristic feature of which is the lower cost than an alkaline battery, a lithium ion battery, and the like. Moreover, for these materials other than the glass flakes, a material having a large particle diameter of from 20 to 800 μm is difficult to obtain inexpensively. On the other hand, glass is inexpensive, has been used in a separator and the like as a component of a lead-acid battery for a long time, has achieved high performance in safety, and does not contain such components as iron and magnesium, which adversely affect the battery.

The glass flakes used are preferably formed of a C-glass composition having acid resistance, in consideration of the application to a separator for a lead-acid battery using a sulfuric acid electrolytic solution.

The base thickness of the microporous film is from 0.1 to 0.3 mm. When the base thickness exceeds 0.3 mm, the electric resistance may be deteriorated, and when the base thickness is less than 0.1 mm, a good resistance to short circuit (which is different from the dendrite short circuit, and means the ordinary short circuit that is caused by the occurrence of a hole or a crack, due to the local weak portion of the base material, the impact or penetration of the protruded portion of the electrode, the oxidation damage caused by the oxidation power from the electrode, and the like) may not be retained.

The porosity (mercury intrusion method) of the microporous film is 50% by volume or more, and thereby the separator for a lead-acid battery can suppress the internal resistance (electric resistance) to a low level, contributing to the enhancement of the performance of the lead-acid battery. Accordingly, the porosity (mercury intrusion method) of the microporous film is preferably from 60 to 90% by volume, and more preferably from 70 to 90% by volume.

The method for providing the microporous film in the invention maybe such a method as described above that the raw material composition mainly containing the polyolefin resin, the silica powder, and the plasticizer is melt-kneaded and formed into a film, from which the plasticizer is entirely or partially removed. According to the method, such a film can be obtained that has complicated pathways that are formed of numerous continuous pores and are uniformly and finely complicated over the entire film. An example of the specific production method will be shown below. A raw materials including prescribed amounts of a polyolefin resin, silica powder, a plasticizer, glass flakes, and a silane coupling agent, and also including various additives (such as a surfactant, an antioxidant, and a weather stabilizer) depending on necessity are mixed and agitated in a mixer, such as a Henschel mixer and a Loedige mixer, to provide a raw material mixture. Subsequently, the mixture is placed in a twin-screw extruder having a T-die attached to the end thereof, and extruded to a sheet form while melt-kneading under heating, and the sheet is passed through a pair of forming rolls, one of which has prescribed grooves engraved thereon, so as to provide a film material containing a flat sheet having on one surface thereof ribs having a prescribed shape molded integrally thereto. Subsequently, the film material is immersed in a suitable solvent (for example, n-hexane) for extracting a prescribed amount of the mineral oil, followed by drying, and thus the target microporous film can be obtained.

The microporous film in the invention has a total content of the polyolefin resin, the silica powder, the plasticizer, and the glass flakes of 90% by weight or more, a content of the polyolefin resin of from 20 to 60% by weight, a content of the silica powder of from 40 to 80% by weight, and a content of the plasticizer of from 0 to 30% by weight, and the amount of the glass flakes therein is from 2 to 15% by weight based on a total amount of the silica powder and the glass flakes. The content of the silane coupling agent (solid content) is generally from 0 to 6% by weight. When the content of the polyolefin resin is less than 20% by weight or the content of the silica powder exceeds 80% by weight, the achievement of the mechanical strength and the oxidation resistance of the microporous film by the polyolefin resin tends to be insufficient, and when the content of the polyolefin resin exceeds 60% by weight, or the content of the silica powder is less than 40% by weight, the large porosity and the fine and complicated pore structure of the microporous film tend to be difficult to retain, and thereby the good electric resistance characteristics of the separator formed of the microporous film may not be retained.

The polyolefin resin used may be a homopolymer or a copolymer, such as polyethylene, polypropylene, polybutene, and polymethylpentene, and mixtures thereof. Among these, the polyolefin resin preferably mainly contains polyethylene from the standpoint of the moldability and the economic efficiency. Polyethylene has a melt-molding temperature that is lower than polypropylene, and has good productivity, suppressing the production cost. The polyolefin may have a weight average molecular weight of 500,000 or more, and thereby even the microporous film containing a large amount of the silica powder can ensure the mechanical strength of the film. Accordingly, the polyolefin resin preferably has a weight average molecular weight of 1,000,000 or more, and more preferably 1,500,000 or more. The polyolefin resin has good mixing property with the silica powder, retains the strength while binding the skeleton of the silica powder therewith as an adhesive material in the microporous film, and is chemically stable with high safety.

The silica powder that can be used may have a small particle diameter and may have a pore structure in the interior thereof and on the surface thereof. The silica powder has wide ranges of selection for the powder characteristics including the particle diameter, the specific surface area, and the like, is easily available at low cost, and contains a small amount of impurities, as compared to various kinds of inorganic powder. The silica powder preferably has a specific surface area of 100 $m^2/g$ or more since thereby the pore structure of the microporous film is further miniaturized (densified) and complicated to enhance the penetration short circuit resistance, the retention power of the microporous film for the electrolytic solution is enhanced, and the hydrophilicity of the microporous film is enhanced through the numerous hydrophilic groups (—OH) on the surface of the powder. Accordingly, the specific surface area of the silica powder is preferably 150 $m^2/g$ or more. The specific surface area of the silica powder is preferably 400 $m^2/g$ or less. The case where the specific surface area of the silica powder exceeds 400 $m^2/g$ is not preferred since the aggregation power of the particles may be enhanced due to the high surface activity thereof, and thus the silica powder maybe prevented from being dispersed uniformly in the microporous film.

For the plasticizer, a material that is capable of becoming a plasticizer for the polyolefin resin is preferably selected, and various organic liquid materials that have compatibility with the polyolefin resin and are capable of being easily extracted with various solvents can be used, examples of which include a mineral oil, such as an industrial lubricant oil formed of a saturated hydrocarbon (paraffin), a higher alcohol, such as stearyl alcohol, and an ester plasticizer, such as dioctyl phthalate. Among these, a mineral oil is preferred since it can be easily reused. The plasticizer is preferably contained in the raw material composition mainly containing the polyolefin resin, the silica powder, and the plasticizer in a content of from 30 to 70% by weight.

After the raw material composition mainly containing the polyolefin resin, the silica powder, and the plasticizer is melt-kneaded and formed into a film, the plasticizer is removed therefrom to form a porous structure, as described above, and the content of the plasticizer in the separator formed of the microporous film may be zero. However, in a separator for a liquid lead-acid battery, a plasticizer, such as a mineral oil, may be contained in an appropriate amount and can be made to contribute to the enhancement of the oxidation resistance. In this case, the content of the plasticizer in the separator is preferably from 5 to 30% by weight.

The solvent that is used for removing the plasticizer by extraction may be a saturated hydrocarbon organic solvent, such as hexane, heptane, octane, nonane, and decane.

The raw material composition and the microporous film each may further be added (mixed), depending on necessity, with additives, such as a surfactant (hydrophilizing agent), an antioxidant, an ultraviolet ray absorbent, a weather stabilizer, a lubricant, an antimicrobial agent, an antifungal agent, a pigment, a dye, a colorant, an antifoggant, and a matting agent, in such ranges that do not impair the object and the effect of the invention.

The microporous film in the invention contains a large amount of the silica powder having a large specific surface area and high hydrophilicity, and thus by itself has hydrophilicity, and has wettability to a sulfuric acid electrolytic solution as an aqueous solution of a lead-acid battery and permeability for a sulfuric acid electrolytic solution, and in the case where a sulfuric acid electrolytic solution is charged to a laminated material containing electrodes and separators incorporated densely in a battery case, in order that the electrolytic solution is quickly absorbed to the pores of the separator, and the pores of the separator are quickly replaced by the electrolytic solution, the microporous film preferably contains a surfactant (solid content) in a content of from 0.2 to 7% by weight, and more preferably from 0.2 to 5% by weight.

The method for adding the surfactant to the microporous film includes a method of adding the plasticizer in a dispersed state in advance to the raw material composition before the film formation (i.e., an internal addition method), and a method of subjecting the microporous film, from which the plasticizer has been removed, to a post-process (attaching treatment) with the plasticizer (i.e., an external addition method), and the method of adding in advance to the raw material composition (i.e., an internal addition method) is preferred since the production process can be simplified, and the surfactant can be prevented from being eluted from the microporous film in the invention. The content (necessary amount) of the surfactant (solid content) may be from 0.2 to 7% by weight in the microporous film. Even thought content of the surfactant (solid content) is increased beyond the range, the effect of enhancing the hydrophilicity of the microporous film may not be largely increased, but the porosity of the microporous film may be decreased, resulting in increase of the internal resistance (electric resistance) of the separator for a lead-acid battery and increase of the self-discharge of the separator for a lead-acid battery. Accordingly, the content of the surfactant (solid content) is more preferably from 0.2 to 5% by weight in the microporous film.

The surfactant suffices to be a material capable of enhancing the hydrophilicity of the microporous film, and any of a nonionic surfactant, a cationic surfactant, and an anionic surfactant may be used. Examples of the nonionic surfactant include a polyoxyethylene alkyl ether compound, a polyoxyethylene alkyl phenyl ether compound, a polyoxyethylene alkyl allyl ether compound, a fatty acid monoglyceride, and a sorbitan fatty acid ester. Examples of the cationic surfactant include an aliphatic amine compound, a quaternary ammonium salt, a polyoxyethylene alkylamine, and an alkylamine oxide. Examples of the anionic surfactant include an alkyl sulfonate, an alkyl benzenesulfonate, an alkyl naphthalenesulfonate, and an alkyl sulfosuccinate. Among these, an alkyl sulfosuccinate is preferred since high hydrophilicity can be imparted to the polyolefin resin with a small amount thereof added, and the relatively high heat resistance thereof may enable the production of the microporous film by adding the surfactant in advance to the raw material composition (i.e., the production by melt-molding under heating).

EXAMPLE

Examples of the invention will be described in detail along with comparative examples.

Example 1

1,000 parts by weight of super high molecular weight polyethylene resin powder having a weight average molecular weight of 1,500,000 (melting point: ca. 135° C.) as the polyolefin resin, 2,516 parts by weight of silica fine powder having a specific surface area by the BET method of 200 $m^2/g$, 5,208 parts by weight of a paraffin mineral oil as the plasticizer, 109 parts by weight of a sodium dialkyl sulfosuccinate (solid content) as the surfactant, and 78 parts by weight of glass flakes having no self-film formability formed of a C-glass composition having an average particle diameter of 250 μm and an average thickness of 1.5 μm were mixed in a Loedige mixer to form a raw material composition, which was extruded with a twin-screw extruder having a T-die attached to the end thereof to a sheet form while melt-kneading under heating, and the sheet was passed through a pair of forming rolls, one of which had prescribed grooves engraved thereon for a rib for contacting an electrode, so as to provide a film material containing a flat sheet having on one surface thereof ribs having a prescribed shape molded integrally thereto. The film material was then immersed in n-hexane for extracting a prescribed amount of the paraffin mineral oil, and then dried, thereby providing a ribbed microporous film constituted by 22.9% by weight of the polyethylene resin, 57.5% by weight of the silica fine powder, 16.0% by weight of the paraffin mineral oil, 1.8% by weight of the surfactant (solid content), and 1.8% by weight of the glass flakes, having a base thickness of 0.20 mm, a porosity by the mercury intrusion method of 60% by volume, an average pore diameter by the mercury intrusion method of 0.09 µm, and a maximum pore diameter by the mercury intrusion method of 0.65 µm. The ribbed microporous film was designated as the separator for a lead-acid battery of Example 1.

Example 2

1,000 parts by weight of super high molecular weight polyethylene resin powder having a weight average molecular weight of 1,500,000 (melting point: ca. 135° C.) as the polyolefin resin, 2,412 parts by weight of silica fine powder having a specific surface area by the BET method of 200 m$^2$/g, 4,993 parts by weight of a paraffin mineral oil as the plasticizer, 109 parts by weight of a sodium dialkyl sulfosuccinate (solid content) as the surfactant, and 182 parts by weight of glass flakes having no self-film formability formed of a C-glass composition having an average particle diameter of 250 µm and an average thickness of 1.5 µm were mixed in a Loedige mixer to form a raw material composition, which was extruded with a twin-screw extruder having a T-die attached to the end thereof to a sheet form while melt-kneading under heating, and the sheet was passed through a pair of forming rolls, one of which had prescribed grooves engraved thereon for a rib for contacting an electrode, so as to provide a film material containing a flat sheet having on one surface thereof ribs having a prescribed shape molded integrally thereto. The film material was then immersed in n-hexane for extracting a prescribed amount of the paraffin mineral oil, and then dried, thereby providing a ribbed microporous film constituted by 22.9% by weight of the polyethylene resin, 55.2% by weight of the silica fine powder, 16.0% by weight of the paraffin mineral oil, 1.8% by weight of the surfactant (solid content), and 4.1% by weight of the glass flakes, having a base thickness of 0.20 mm, a porosity by the mercury intrusion method of 58% by volume, an average pore diameter by the mercury intrusion method of 0.09 µm, and a maximum pore diameter by the mercury intrusion method of 0.65 µm. The ribbed microporous film was designated as the separator for a lead-acid battery of Example 2.

Example 3

1,000 parts by weight of super high molecular weight polyethylene resin powder having a weight average molecular weight of 1,500,000 (melting point: ca. 135° C.) as the polyolefin resin, 2,282 parts by weight of silica fine powder having a specific surface area by the BET method of 200 m$^2$/g, 4,724 parts by weight of a paraffin mineral oil as the plasticizer, 109 parts by weight of a sodium dialkyl sulfosuccinate (solid content) as the surfactant, and 311 parts by weight of glass flakes having no self-film formability formed of a C-glass composition having an average particle diameter of 250 µm and an average thickness of 1.5 µm were mixed in a Loedige mixer to form a raw material composition, which was extruded with a twin-screw extruder having a T-die attached to the end thereof to a sheet form while melt-kneading under heating, and the sheet was passed through a pair of forming rolls, one of which had prescribed grooves engraved thereon for a rib for contacting an electrode, so as to provide a film material containing a flat sheet having on one surface thereof ribs having a prescribed shape molded integrally thereto. The film material was then immersed in n-hexane for extracting a prescribed amount of the paraffin mineral oil, and then dried, thereby providing a ribbed microporous film constituted by 22.9% by weight of the polyethylene resin, 52.2% by weight of the silica fine powder, 16.0% by weight of the paraffin mineral oil, 1.8% by weight of the surfactant (solid content), and 7.1% by weight of the glass flakes, having a base thickness of 0.20 mm, a porosity by the mercury intrusion method of 53% by volume, an average pore diameter by the mercury intrusion method of 0.09 µm, and a maximum pore diameter by the mercury intrusion method of 0.65 µm. The ribbed microporous film was designated as the separator for a lead-acid battery of Example 3.

Example 4

1,000 parts by weight of super high molecular weight polyethylene resin powder having a weight average molecular weight of 1,500,000 (melting point: ca. 135° C.) as the polyolefin resin, 2,412 parts by weight of silica fine powder having a specific surface area by the BET method of 200 m$^2$/g, 4,993 parts by weight of a paraffin mineral oil as the plasticizer, 109 parts by weight of a sodium dialkyl sulfosuccinate (solid content) as the surfactant, 182 parts by weight of glass flakes having no self-film formability formed of a C-glass composition having an average particle diameter of 250 µm and an average thickness of 1.5 µm, and 18 parts by weight of a silane coupling agent (solid content) were mixed in a Loedige mixer to form a raw material composition, which was extruded with a twin-screw extruder having a T-die attached to the end thereof to a sheet form while melt-kneading under heating, and the sheet was passed through a pair of forming rolls, one of which had prescribed grooves engraved thereon for a rib for contacting an electrode, so as to provide a film material containing a flat sheet having on one surface thereof ribs having a prescribed shape molded integrally thereto. The film material was then immersed in n-hexane for extracting a prescribed amount of the paraffin mineral oil, and then dried, thereby providing a ribbed microporous film constituted by 22.8% by weight of the polyethylene resin, 54.9% by weight of the silica fine powder, 16.0% by weight of the paraffin mineral oil, 1.8% by weight of the surfactant (solid content), 4.1% by weight of the glass flakes, and 0.4% by weight of the silane coupling agent (solid content), having a base thickness of 0.20 mm, a porosity by the mercury intrusion method of 58% by volume, an average pore diameter by the mercury intrusion method of 0.09 µm, and a maximum pore diameter by the mercury intrusion method of 0.65 µm. The ribbed microporous film was designated as the separator for a lead-acid battery of Example 4.

Example 5

1,000 parts by weight of super high molecular weight polyethylene resin powder having a weight average molecular weight of 1,500,000 (melting point: ca. 135° C.) as the polyolefin resin, 2,412 parts by weight of silica fine powder having a specific surface area by the BET method of 200 m²/g, 4,993 parts by weight of a paraffin mineral oil as the plasticizer, 109 parts by weight of a sodium dialkyl sulfosuccinate (solid content) as the surfactant, 182 parts by weight of glass flakes having no self-film formability formed of a C-glass composition having an average particle diameter of 250 μm and an average thickness of 1.5 μm, and 70 parts by weight of a silane coupling agent (solid content) were mixed in a Loedige mixer to form a raw material composition, which was extruded with a twin-screw extruder having a T-die attached to the end thereof to a sheet form while melt-kneading under heating, and the sheet was passed through a pair of forming rolls, one of which had prescribed grooves engraved thereon for a rib for contacting an electrode, so as to provide a film material containing a flat sheet having on one surface thereof ribs having a prescribed shape molded integrally thereto. The film material was then immersed in n-hexane for extracting a prescribed amount of the paraffin mineral oil, and then dried, thereby providing a ribbed microporous film constituted by 22.4% by weight of the polyethylene resin, 54.1% by weight of the silica fine powder, 16.0% by weight of the paraffin mineral oil, 1.8% by weight of the surfactant (solid content), 4.1% by weight of the glass flakes, and 1.6% by weight of the silane coupling agent (solid content), having a base thickness of 0.20 mm, a porosity by the mercury intrusion method of 58% by volume, an average pore diameter by the mercury intrusion method of 0.09 μm, and a maximum pore diameter by the mercury intrusion method of 0.65 μm. The ribbed microporous film was designated as the separator for a lead-acid battery of Example 5.

Example 6

1,000 parts by weight of super high molecular weight polyethylene resin powder having a weight average molecular weight of 1,500,000 (melting point: ca. 135° C.) as the polyolefin resin, 2,282 parts by weight of silica fine powder having a specific surface area by the BET method of 200 m²/g, 4,724 parts by weight of a paraffin mineral oil as the plasticizer, 109 parts by weight of a sodium dialkyl sulfosuccinate (solid content) as the surfactant, 311 parts by weight of glass flakes having no self-film formability formed of a C-glass composition having an average particle diameter of 250 μm and an average thickness of 1.5 μm, and 71 parts by weight of a silane coupling agent (solid content) were mixed in a Loedige mixer to form a raw material composition, which was extruded with a twin-screw extruder having a T-die attached to the end thereof to a sheet form while melt-kneading under heating, and the sheet was passed through a pair of forming rolls, one of which had prescribed grooves engraved thereon for a rib for contacting an electrode, so as to provide a film material containing a flat sheet having on one surface thereof ribs having a prescribed shape molded integrally thereto. The film material was then immersed in n-hexane for extracting a prescribed amount of the paraffin mineral oil, and then dried, thereby providing a ribbed microporous film constituted by 22.4% by weight of the polyethylene resin, 51.2% by weight of the silica fine powder, 16.0% by weight of the paraffin mineral oil, 1.8% by weight of the surfactant (solid content), 7.0% by weight of the glass flakes, and 1.6% by weight of the silane coupling agent (solid content), having a base thickness of 0.20 mm, a porosity by the mercury intrusion method of 53% by volume, an average pore diameter by the mercury intrusion method of 0.09 μm, and a maximum pore diameter by the mercury intrusion method of 0.65 μm. The ribbed microporous film was designated as the separator for a lead-acid battery of Example 6.

Example 7

1,000 parts by weight of super high molecular weight polyethylene resin powder having a weight average molecular weight of 1,500,000 (melting point: ca. 135° C.) as the polyolefin resin, 2,412 parts by weight of silica fine powder having a specific surface area by the BET method of 200 m²/g, 4,993 parts by weight of a paraffin mineral oil as the plasticizer, 109 parts by weight of a sodium dialkyl sulfosuccinate (solid content) as the surfactant, and 182 parts by weight of glass flakes having no self-film formability formed of a C-glass composition having an average particle diameter of 250 μm and an average thickness of 0.5 μm were mixed in a Loedige mixer to form a raw material composition, which was extruded with a twin-screw extruder having a T-die attached to the end thereof to a sheet form while melt-kneading under heating, and the sheet was passed through a pair of forming rolls, one of which had prescribed grooves engraved thereon for a rib for contacting an electrode, so as to provide a film material containing a flat sheet having on one surface thereof ribs having a prescribed shape molded integrally thereto. The film material was then immersed in n-hexane for extracting a prescribed amount of the paraffin mineral oil, and then dried, thereby providing a ribbed microporous film constituted by 22.9% by weight of the polyethylene resin, 55.2% by weight of the silica fine powder, 16.0% by weight of the paraffin mineral oil, 1.8% by weight of the surfactant (solid content), and 4.1% by weight of the glass flakes, having a base thickness of 0.20 mm, a porosity by the mercury intrusion method of 58% by volume, an average pore diameter by the mercury intrusion method of 0.09 μm, and a maximum pore diameter by the mercury intrusion method of 0.65 μm. The ribbed microporous film was designated as the separator for a lead-acid battery of Example 7.

Example 8

1,000 parts by weight of super high molecular weight polyethylene resin powder having a weight average molecular weight of 1,500,000 (melting point: ca. 135° C.) as the polyolefin resin, 2,516 parts by weight of silica fine powder having a specific surface area by the BET method of 200 m²/g, 5,208 parts by weight of a paraffin mineral oil as the plasticizer, 109 parts by weight of a sodium dialkyl sulfosuccinate (solid content) as the surfactant, and 78 parts by weight of glass flakes having no self-film formability formed of a C-glass composition having an average particle diameter of 250 μm and an average thickness of 0.5 μm were mixed in a Loedige mixer to form a raw material composition, which was extruded with a twin-screw extruder having a T-die attached to the end thereof to a sheet form while melt-kneading under heating, and the sheet was passed through a pair of forming rolls, one of which had prescribed grooves engraved thereon for a rib for contacting an electrode, so as to provide a film material containing a flat sheet having on one surface thereof ribs having a prescribed shape molded integrally thereto. The film material was then immersed in n-hexane for extracting a prescribed amount of the paraffin mineral oil, and then dried, thereby providing a ribbed microporous film constituted by 22.9% by weight of the polyethylene resin, 57.6% by weight of the silica fine powder, 16.0% by weight of the paraffin mineral oil, 1.8% by weight of the surfactant (solid content), and 1.7% by weight of the glass flakes, having a base thickness of 0.20 mm, a porosity by the mercury intrusion method of 59% by volume, an average pore diameter by the mercury intrusion method of 0.09 µm, and a maximum pore diameter by the mercury intrusion method of 0.65 µm. The ribbed microporous film was designated as the separator for a lead-acid battery of Example 8.

Example 9

1,000 parts by weight of super high molecular weight polyethylene resin powder having a weight average molecular weight of 1,500,000 (melting point: ca. 135° C.) as the polyolefin resin, 2,282 parts by weight of silica fine powder having a specific surface area by the BET method of 200 m$^2$/g, 4,724 parts by weight of a paraffin mineral oil as the plasticizer, 109 parts by weight of a sodium dialkyl sulfosuccinate (solid content) as the surfactant, and 311 parts by weight of glass flakes having no self-film formability formed of a C-glass composition having an average particle diameter of 250 µm and an average thickness of 6.0 µm were mixed in a Loedige mixer to form a raw material composition, which was extruded with a twin-screw extruder having a T-die attached to the end thereof to a sheet form while melt-kneading under heating, and the sheet was passed through a pair of forming rolls, one of which had prescribed grooves engraved thereon for a rib for contacting an electrode, so as to provide a film material containing a flat sheet having on one surface thereof ribs having a prescribed shape molded integrally thereto. The film material was then immersed in n-hexane for extracting a prescribed amount of the paraffin mineral oil, and then dried, thereby providing a ribbed microporous film constituted by 22.9% by weight of the polyethylene resin, 52.2% by weight of the silica fine powder, 16.0% by weight of the paraffin mineral oil, 1.8% by weight of the surfactant (solid content), and 7.1% by weight of the glass flakes, having a base thickness of 0.20 mm, a porosity by the mercury intrusion method of 53% by volume, an average pore diameter by the mercury intrusion method of 0.09 µm, and a maximum pore diameter by the mercury intrusion method of 0.65 µm. The ribbed microporous film was designated as the separator for a lead-acid battery of Example 9.

Example 10

1,000 parts by weight of super high molecular weight polyethylene resin powder having a weight average molecular weight of 1,500,000 (melting point: ca. 135° C.) as the polyolefin resin, 2,412 parts by weight of silica fine powder having a specific surface area by the BET method of 200 m$^2$/g, 4,993 parts by weight of a paraffin mineral oil as the plasticizer, 109 parts by weight of a sodium dialkyl sulfosuccinate (solid content) as the surfactant, and 182 parts by weight of glass flakes having no self-film formability formed of a C-glass composition having an average particle diameter of 50 µm and an average thickness of 1.5 µm were mixed in a Loedige mixer to form a raw material composition, which was extruded with a twin-screw extruder having a T-die attached to the end thereof to a sheet form while melt-kneading under heating, and the sheet was passed through a pair of forming rolls, one of which had prescribed grooves engraved thereon for a rib for contacting an electrode, so as to provide a film material containing a flat sheet having on one surface thereof ribs having a prescribed shape molded integrally thereto. The film material was then immersed in n-hexane for extracting a prescribed amount of the paraffin mineral oil, and then dried, thereby providing a ribbed microporous film constituted by 22.9% by weight of the polyethylene resin, 55.2% by weight of the silica fine powder, 16.0% by weight of the paraffin mineral oil, 1.8% by weight of the surfactant (solid content), and 4.1% by weight of the glass flakes, having a base thickness of 0.20 mm, a porosity by the mercury intrusion method of 58% by volume, an average pore diameter by the mercury intrusion method of 0.09 µm, and a maximum pore diameter by the mercury intrusion method of 0.65 µm. The ribbed microporous film was designated as the separator for a lead-acid battery of Example 10.

Example 11

1,000 parts by weight of super high molecular weight polyethylene resin powder having a weight average molecular weight of 1,500,000 (melting point: ca. 135° C.) as the polyolefin resin, 2,412 parts by weight of silica fine powder having a specific surface area by the BET method of 200 m$^2$/g, 4,993 parts by weight of a paraffin mineral oil as the plasticizer, 109 parts by weight of a sodium dialkyl sulfosuccinate (solid content) as the surfactant, and 182 parts by weight of glass flakes having no self-film formability formed of a C-glass composition having an average particle diameter of 140 µm and an average thickness of 1.5 µm were mixed in a Loedige mixer to form a raw material composition, which was extruded with a twin-screw extruder having a T-die attached to the end thereof to a sheet form while melt-kneading under heating, and the sheet was passed through a pair of forming rolls, one of which had prescribed grooves engraved thereon for a rib for contacting an electrode, so as to provide a film material containing a flat sheet having on one surface thereof ribs having a prescribed shape molded integrally thereto. The film material was then immersed in n-hexane for extracting a prescribed amount of the paraffin mineral oil, and then dried, thereby providing a ribbed microporous film constituted by 22.9% by weight of the polyethylene resin, 55.2% by weight of the silica fine powder, 16.0% by weight of the paraffin mineral oil, 1.8% by weight of the surfactant (solid content), and 4.1% by weight of the glass flakes, having a base thickness of 0.20 mm, a porosity by the mercury intrusion method of 58% by volume, an average pore diameter by the mercury intrusion method of 0.09 µm, and a maximum pore diameter by the mercury intrusion method of 0.65 µm. The ribbed microporous film was designated as the separator for a lead-acid battery of Example 11.

Example 12

1,000 parts by weight of super high molecular weight polyethylene resin powder having a weight average molecular weight of 1,500,000 (melting point: ca. 135° C.) as the polyolefin resin, 2,412 parts by weight of silica fine powder having a specific surface area by the BET method of 200 m$^2$/g, 4,993 parts by weight of a paraffin mineral oil as the plasticizer, 109 parts by weight of a sodium dialkyl sulfosuccinate (solid content) as the surfactant, and 182 parts by weight of glass flakes having no self-film formability formed of a C-glass composition having an average particle diameter of 600 µm and an average thickness of 1.5 µm were mixed in a Loedige mixer to form a raw material composition, which was extruded with a twin-screw extruder having a T-die attached to the end thereof to a sheet form while melt-kneading under heating, and the sheet was passed through a pair of forming rolls, one of which had prescribed grooves engraved thereon for a rib for contacting an electrode, so as to provide a film material containing a flat sheet having on one surface thereof ribs having a prescribed shape molded integrally thereto. The film material was then immersed in n-hexane for extracting a prescribed amount of the paraffin mineral oil, and then dried, thereby providing a ribbed microporous film constituted by 22.9% by weight of the polyethylene resin, 55.2% by weight of the silica fine powder, 16.0% by weight of the paraffin mineral oil, 1.8% by weight of the surfactant (solid content), and 4.1% by weight of the glass flakes, having a base thickness of 0.20 mm, a porosity by the mercury intrusion method of 58% by volume, an average pore diameter by the mercury intrusion method of 0.09 µm, and a maximum pore diameter by the mercury intrusion method of 0.65 µm. The ribbed microporous film was designated as the separator for a lead-acid battery of Example 12.

Comparative Example 1

1,000 parts by weight of super high molecular weight polyethylene resin powder having a weight average molecular weight of 1,500,000 (melting point: ca. 135° C.) as the polyolefin resin, 2,568 parts by weight of silica fine powder having a specific surface area by the BET method of 200 m$^2$/g, 5,316 parts by weight of a paraffin mineral oil as the plasticizer, 109 parts by weight of a sodium dialkyl sulfosuccinate (solid content) as the surfactant, and 26 parts by weight of glass flakes having no self-film formability formed of a C-glass composition having an average particle diameter of 250 µm and an average thickness of 1.5 µm were mixed in a Loedige mixer to form a raw material composition, which was extruded with a twin-screw extruder having a T-die attached to the end thereof to a sheet form while melt-kneading under heating, and the sheet was passed through a pair of forming rolls, one of which had prescribed grooves engraved thereon for a rib for contacting an electrode, so as to provide a film material containing a flat sheet having on one surface thereof ribs having a prescribed shape molded integrally thereto. The film material was then immersed in n-hexane for extracting a prescribed amount of the paraffin mineral oil, and then dried, thereby providing a ribbed microporous film constituted by 22.9% by weight of the polyethylene resin, 58.7% by weight of the silica fine powder, 16.0% by weight of the paraffin mineral oil, 1.8% by weight of the surfactant (solid content), and 0.6% by weight of the glass flakes, having a base thickness of 0.20 mm, a porosity by the mercury intrusion method of 61% by volume, an average pore diameter by the mercury intrusion method of 0.09 µm, and a maximum pore diameter by the mercury intrusion method of 0.65 µm. The ribbed microporous film was designated as the separator for a lead-acid battery of Comparative Example 1.

Comparative Example 2

1,000 parts by weight of super high molecular weight polyethylene resin powder having a weight average molecular weight of 1,500,000 (melting point: ca. 135° C.) as the polyolefin resin, 2,075 parts by weight of silica fine powder having a specific surface area by the BET method of 200 m$^2$/g, 4,295 parts by weight of a paraffin mineral oil as the plasticizer, 109 parts by weight of a sodium dialkyl sulfosuccinate (solid content) as the surfactant, and 519 parts by weight of glass flakes having no self-film formability formed of a C-glass composition having an average particle diameter of 250 µm and an average thickness of 1.5 µm were mixed in a Loedige mixer to form a raw material composition, which was extruded with a twin-screw extruder having a T-die attached to the end thereof to a sheet form while melt-kneading under heating, and the sheet was passed through a pair of forming rolls, one of which had prescribed grooves engraved thereon for a rib for contacting an electrode, so as to provide a film material containing a flat sheet having on one surface thereof ribs having a prescribed shape molded integrally thereto. The film material was then immersed in n-hexane for extracting a prescribed amount of the paraffin mineral oil, and then dried, thereby providing a ribbed microporous film constituted by 22.9% by weight of the polyethylene resin, 47.4% by weight of the silica fine powder, 16.0% by weight of the paraffin mineral oil, 1.8% by weight of the surfactant (solid content), and 11.9% by weight of the glass flakes, having a base thickness of 0.20 mm, a porosity by the mercury intrusion method of 50% by volume, an average pore diameter by the mercury intrusion method of 0.09 µm, and a maximum pore diameter by the mercury intrusion method of 0.65 µm. The ribbed microporous film was designated as the separator for a lead-acid battery of Comparative Example 2.

Comparative Example 3

1,000 parts by weight of super high molecular weight polyethylene resin powder having a weight average molecular weight of 1,500,000 (melting point: ca. 135° C.) as the polyolefin resin, 2,412 parts by weight of silica fine powder having a specific surface area by the BET method of 200 m$^2$/g, 4,993 parts by weight of a paraffin mineral oil as the plasticizer, 109 parts by weight of a sodium dialkyl sulfosuccinate (solid content) as the surfactant, 182 parts by weight of glass flakes having no self-film formability formed of a C-glass composition having an average particle diameter of 250 µm and an average thickness of 1.5 µm, and 315 parts by weight of a silane coupling agent (solid content) were mixed in a Loedige mixer to form a raw material composition, which was extruded with a twin-screw extruder having a T-die attached to the end thereof to a sheet form while melt-kneading under heating, and the sheet was passed through a pair of forming rolls, one of which had prescribed grooves engraved thereon for a rib for contacting an electrode, so as to provide a film material containing a flat sheet having on one surface thereof ribs having a prescribed shape molded integrally thereto. The film material was then immersed in n-hexane for extracting a prescribed amount of the paraffin mineral oil, and then dried, thereby providing a ribbed microporous film constituted by 21.0% by weight of the polyethylene resin, 50.8% by weight of the silica fine powder, 16.0% by weight of the paraffin mineral oil, 1.8% by weight of the surfactant (solid content), 3.8% by weight of the glass flakes, and 6.6% by weight of the silane coupling agent (solid content), having a base thickness of 0.20 mm, a porosity by the mercury intrusion method of 58% by volume, an average pore diameter by the mercury intrusion method of 0.09 µm, and a maximum pore diameter by the mercury intrusion method of 0.65 µm. The ribbed microporous film was designated as the separator for a lead-acid battery of Comparative Example 3.

Comparative Example 4

1,000 parts by weight of super high molecular weight polyethylene resin powder having a weight average molecular weight of 1,500,000 (melting point: ca. 135° C.) as the polyolefin resin, 2,282 parts by weight of silica fine powder having a specific surface area by the BET method of 200 m$^2$/g, 4,724 parts by weight of a paraffin mineral oil as the plasticizer, 109 parts by weight of a sodium dialkyl sulfosuccinate (solid content) as the surfactant, and 311 parts by weight of glass flakes having no self-film formability formed of a C-glass composition having an average particle diameter of 250 μm and an average thickness of 10.0 μm were mixed in a Loedige mixer to form a raw material composition, which was extruded with a twin-screw extruder having a T-die attached to the end thereof to a sheet form while melt-kneading under heating, and the sheet was passed through a pair of forming rolls, one of which had prescribed grooves engraved thereon for a rib for contacting an electrode, so as to provide a film material containing a flat sheet having on one surface thereof ribs having a prescribed shape molded integrally thereto. The film material was then immersed in n-hexane for extracting a prescribed amount of the paraffin mineral oil, and then dried, thereby providing a ribbed microporous film constituted by 22.9% by weight of the polyethylene resin, 52.2% by weight of the silica fine powder, 16.0% by weight of the paraffin mineral oil, 1.8% by weight of the surfactant (solid content), and 7.1% by weight of the glass flakes, having abase thickness of 0.20 mm, a porosity by the mercury intrusion method of 53% by volume, an average pore diameter by the mercury intrusion method of 0.09 μm, and a maximum pore diameter by the mercury intrusion method of 0.65 μm. The ribbed microporous film was designated as the separator for a lead-acid battery of Comparative Example 4.

Comparative Example 5

1,000 parts by weight of super high molecular weight polyethylene resin powder having a weight average molecular weight of 1,500,000 (melting point: ca. 135° C.) as the polyolefin resin, 2,210 parts by weight of silica fine powder having a specific surface area by the BET method of 200 m$^2$/g, 4,580 parts by weight of a paraffin mineral oil as the plasticizer, 109 parts by weight of a sodium dialkyl sulfosuccinate (solid content) as the surfactant, and 390 parts by weight of glass flakes having no self-film formability formed of a C-glass composition having an average particle diameter of 10 μm and an average thickness of 1.5 μm were mixed in a Loedige mixer to form a raw material composition, which was extruded with a twin-screw extruder having a T-die attached to the end thereof to a sheet form while melt-kneading under heating, and the sheet was passed through a pair of forming rolls, one of which had prescribed grooves engraved thereon for a rib for contacting an electrode, so as to provide a film material containing a flat sheet having on one surface thereof ribs having a prescribed shape molded integrally thereto. The film material was then immersed in n-hexane for extracting a prescribed amount of the paraffin mineral oil, and then dried, thereby providing a ribbed microporous film constituted by 22.8% by weight of the polyethylene resin, 50.5% by weight of the silica fine powder, 16.0% by weight of the paraffin mineral oil, 1.8% by weight of the surfactant (solid content), and 8.9% by weight of the glass flakes, having a base thickness of 0.20 mm, a porosity by the mercury intrusion method of 51% by volume, an average pore diameter by the mercury intrusion method of 0.09 μm, and a maximum pore diameter by the mercury intrusion method of 0.65 μm. The ribbed microporous film was designated as the separator for a lead-acid battery of Comparative Example 5.

Comparative Example 6

1,000 parts by weight of super high molecular weight polyethylene resin powder having a weight average molecular weight of 1,500,000 (melting point: ca. 135° C.) as the polyolefin resin, 2,412 parts by weight of silica fine powder having a specific surface area by the BET method of 200 m$^2$/g, 4,993 parts by weight of a paraffin mineral oil as the plasticizer, 109 parts by weight of a sodium dialkyl sulfosuccinate (solid content) as the surfactant, and 182 parts by weight of glass flakes having no self-film formability formed of a C-glass composition having an average particle diameter of 1,000 μm and an average thickness of 1.5 μm were mixed in a Loedige mixer to form a raw material composition, which was extruded with a twin-screw extruder having a T-die attached to the end thereof to a sheet form while melt-kneading under heating, and the sheet was passed through a pair of forming rolls, one of which had prescribed grooves engraved thereon for a rib for contacting an electrode, so as to provide a film material containing a flat sheet having on one surface thereof ribs having a prescribed shape molded integrally thereto. The film material was then immersed in n-hexane for extracting a prescribed amount of the paraffin mineral oil, and then dried, thereby providing a ribbed microporous film constituted by 22.9% by weight of the polyethylene resin, 55.2% by weight of the silica fine powder, 16.0% by weight of the paraffin mineral oil, 1.8% by weight of the surfactant (solid content), and 4.1% by weight of the glass flakes, having abase thickness of 0.20 mm, a porosity by the mercury intrusion method of 58% by volume, an average pore diameter by the mercury intrusion method of 0.09 μm, and a maximum pore diameter by the mercury intrusion method of 0.65 μm. The ribbed microporous film was designated as the separator for a lead-acid battery of Comparative Example 6.

Reference Example 1,000 parts by weight of super high molecular weight polyethylene resin powder having a weight average molecular weight of 1,500,000 (melting point: ca. 135° C.) as the polyolefin resin, 2,590 parts by weight of silica fine powder having a specific surface area by the BET method of 200 m$^2$/g, 5,380 parts by weight of a paraffin mineral oil as the plasticizer, and 109 parts by weight of a sodium dialkyl sulfosuccinate (solid content) as the surfactant were mixed in a Loedige mixer to form a raw material composition, which was extruded with a twin-screw extruder having a T-die attached to the end thereof to a sheet form while melt-kneading under heating, and the sheet was passed through a pair of forming rolls, one of which had prescribed grooves engraved thereon for a rib for contacting an electrode, so as to provide a film material containing a flat sheet having on one surface thereof ribs having a prescribed shape molded integrally thereto. The film material was then immersed in n-hexane for extracting a prescribed amount of the paraffin mineral oil, and then dried, thereby providing a ribbed microporous film constituted by 22.9% by weight of the polyethylene resin, 59.3% by weight of the silica fine powder, 16.0% by weight of the paraffin mineral oil, and 1.8% by weight of the surfactant (solid content), having a base thickness of 0.20 mm, a porosity by the mercury intrusion method of 62% by volume, an average pore diameter by the mercury intrusion method of 0.09 μm, and a maximum pore diameter by the mercury intrusion method of 0.65 μm. The ribbed microporous film was designated as the separator for a lead-acid battery of Reference Example.

The separators of Examples 1 to 12, Comparative Examples 1 to 6, and Reference Example obtained above each were evaluated for various characteristics in the following manners. The results are shown in Tables 1 and 2. In the description, MD (MD Direction) means the production direction of the sheet thus produced, and CD (CD Direction) means the direction that is perpendicular to MD.

Average Particle Diameter (Glass Flakes)

Plural cross sectional images (which might partially contain a surface image) in the direction in parallel to the plane direction of the microporous film were randomly obtained with a high-resolution 3D X-ray microscope (produced by Rigaku Corporation), based on which the particle diameter of the glass flakes (i.e., the square root of the area of the primary particles of the glass flakes in planar view) was measured randomly for 50 particles (which included only the particles that had a particle diameter of 10 μm or more), and the average value thereof was obtained and designated as the average particle diameter (μm). The method for measuring the average particle diameter of the glass flakes as a raw material was not in accordance with this method (provided that the definition of the particle diameter was the same, i.e., the square root of the area of the primary particles of the glass flakes in planar view).

Dispersion Uniformity (Silica Fine Powder)

Plural cross sectional images in the direction perpendicular to the plane direction of the microporous film were randomly obtained with a high-resolution 3D X-ray microscope (produced by Rigaku Corporation), and the size and the extent of presence of the aggregates of the silica powder shown in white in the images (while a portion having a relatively large electron density is shown in white in the image, the aggregate of the silica powder has a relatively large electron density in the microporous film, and thus is shown in white therein) were investigated for evaluating the dispersion uniformity. In general, the silica powder is present in the form of secondary particles, which are formed through aggregation of the primary particles, and also tends to form tertiary particles, which are formed through further aggregation of the secondary particles. In the production of the microporous film, while the raw materials are uniformly dispersed by mixing and agitating with a special mixer or the like to provide the raw material mixture, it is ideal that the tertiary particles (i.e., the aggregates of the secondary particles) of the silica powder are favorably pulverized to disperse to the level of the secondary particles, and the actual state is to close to the ideal state as much as possible. The high dispersion uniformity of the raw material mixture means that the raw materials in the microporous film also have high dispersion uniformity (except for the case where the condition in the melt-kneading and film-forming process after producing the raw material mixture is such a condition that tends to pulverize the glass flakes), and the high dispersion uniformity of the silica powder means that the raw materials including the glass flakes also have high dispersion uniformity (except for the case where the condition in the melt-kneading and film-forming process after producing the raw material mixture is such a condition that tends to pulverize the glass flakes).

Dispersion Uniformity (Glass Flakes)

50 cross sectional images in the direction perpendicular to the plane direction of the microporous film were randomly obtained with a high-resolution 3D X-ray microscope (produced by Rigaku Corporation), and the dispersed state of the glass flakes (which were primary particles that had a particle diameter of 10 μm or more) shown in white in the images was investigated for evaluating the dispersion uniformity.

Orientation and Angle (Glass Flakes)

Plural cross sectional images in the direction perpendicular to the plane direction of the microporous film were randomly obtained with a high-resolution 3D X-ray microscope (produced by Rigaku Corporation), based on which the orientation (angle) of the glass flakes (primary particles) shown in white in the images was checked (measured) randomly for 50 particles, and evaluated (calculated for the average value thereof).

Base Thickness

Several arbitrary positions of the microporous film (which were the positions having no rib protrusion in the case where the microporous film had a rib protrusion) were measured with a dial gauge (Peacock G6, produced by Ozaki Mfg. Co., Ltd.).

Tensile Strength and Elongation

The microporous film was cut into a rectangular shape of 10 mm×70 mm in MD and CD respectively to provide a test piece. The test piece was mounted on a Schopper type tensile tester or an equivalent thereof having a capacity of 294 N or less with a chuck distance (a) of approximately 50 mm, and subjected to a tensile test at a tensile speed of 200 mm/min, and the tensile load (b) and the distance (c) at the breakage of the test piece was read. The tensile strength was calculated by dividing the tensile load (b) by the cross sectional area of the test piece. The elongation was calculated by dividing the distance (c) by the chuck distance (a) of the tester.

Porosity

The porosity was calculated from the pore volume (mercury intrusion method) and the true density (immersion method) of the microporous film according to the following expression.

$$\text{porosity} = Vp/((1/\rho)+Vp)$$

wherein $Vp$ represents the pore volume ($cm^3/g$), and $\rho$ represents the true density ($cm^3/g$).

Average Pore Diameter

The pore diameter distribution was calculated from the pressure and the volume of mercury in the intrusion of mercury. The pore diameter, at which mercury in an amount of 50% of the total pore volume had been intruded, was designated as the average pore diameter (median diameter).

Maximum Pore Diameter

The pore diameter, at which the intrusion of mercury was started, was obtained from the pore diameter distribution curve in the test for the average pore diameter, and designated as the maximum pore diameter.

Permeability

The microporous film was cut into a square shape of 2 cm×2 cm to provide a test piece, which was floated on a water surface in a Petri dish having water charged therein, and the period of time until the entire test piece became translucent due to permeation of water over the entire test piece was measured, and designated as the permeability (second).

Electric Resistance

The microporous film was cut into a square shape of 70 mm×70 mm to provide a test piece, which was measured for electric resistance with a test device according to SBA S0402.

Oxidation Resistance Lifetime

A positive electrode and a negative electrode each having a square shape of 50 mm×50 mm formed of a lead sheet were laminated along with the separator formed of the microporous film cut into a square shape of 70 mm×70 mm intervening therebetween, concentrically with the directions of the square shapes being aligned. The electrode group containing the positive electrode (one sheet), the separator (one sheet), and the negative electrode (one sheet) laminated on each other was incorporated in a battery case under application of a pressure of 19.6 kPa, and 1,000 mL of a diluted sulfuric acid electrolytic solution having a specific gravity of 1.300 (20° C.) was charged thereto, to which a direct constant current of 5.0 A was applied at a liquid temperature of 50±2° C., and the electrification time until the terminal voltage became 2.6 V or less or the difference in potential became 0.2 V or more was measured, and designated as the oxidation resistance lifetime (hour). The relative values with respect to the value of Reference Example 1 as 100 are shown in Tables 1 and 2.

Dendrite Short Circuit Characteristics

The microporous film cut into a square shape of 70 mm×70 mm was held between two sheets of lead electrode plates (formed of pure lead having a thickness of 3 mm) having a square shape of 50 mm×50 mm in such a manner that the centers of the three squares of the microporous film and two sheets of the lead electrode plates were agree with each other, and the edges of the three squares were in parallel to each other, and the assembly was placed horizontally in a battery case. A weight of 5 kg was placed thereon (at the center of the squares), and then a saturated lead sulfate aqueous solution was charged therein. Thereafter, an electric current of 3.2 mA was applied to the lead electrode plates, and the change of the voltage was continuously recorded. The voltage was slightly increased after the start of electrification, and then gradually decreased. The period of time until the voltage was decreased to 70% of the maximum voltage was measured. The relative values with respect to the value of Reference Example as 100 are shown in Tables 1 and 2.

TABLE 1

|  |  |  | Unit | Example 1 | Example 2 | Example 3 | Example 4 | Example 5 | Example 6 |
|---|---|---|---|---|---|---|---|---|---|
| Raw material | Glass flakes | Average particle diameter | μm | 250 | 250 | 250 | 250 | 250 | 250 |
|  |  | Average thickness | μm | 1.5 | 1.5 | 1.5 | 1.5 | 1.5 | 1.5 |
|  |  | Content (based on total amount of silica fine powder and glass flakes) | % by weight | 3.0 | 7.0 | 12.0 | 7.0 | 7.0 | 12.0 |
|  | Mixing amount | Polyethylene resin | part by weight | 1000 | 1000 | 1000 | 1000 | 1000 | 1000 |
|  |  | Silica fine powder | part by weight | 2516 | 2412 | 2282 | 2412 | 2412 | 2282 |
|  |  | Glass flakes | part by weight | 78 | 182 | 311 | 182 | 182 | 311 |
|  |  | Paraffin mineral oil | part by weight | 5208 | 4993 | 4724 | 4993 | 4993 | 4724 |
|  |  | Surfactant | part by weight | 109 | 109 | 109 | 109 | 109 | 109 |
|  |  | Silane coupling agent | part by weight | 0 | 0 | 0 | 18 | 70 | 71 |
|  |  | Total | part by weight | 8911 | 8696 | 8426 | 8714 | 8766 | 8497 |
|  | Mixing ratio | Polyethylene resin | % by weight | 11.2 | 11.5 | 11.9 | 11.5 | 11.4 | 11.8 |
|  |  | Silica fine powder | % by weight | 28.2 | 27.7 | 27.1 | 27.7 | 27.5 | 26.9 |
|  |  | Glass flakes | % by weight | 0.9 | 2.1 | 3.7 | 2.1 | 2.1 | 3.7 |
|  |  | Paraffin mineral oil | % by weight | 58.5 | 57.4 | 56.0 | 57.3 | 57.0 | 55.5 |
|  |  | Surfactant | % by weight | 1.2 | 1.3 | 1.3 | 1.2 | 1.2 | 1.3 |
|  |  | Silane coupling agent | % by weight | 0 | 0 | 0 | 0.2 | 0.8 | 0.8 |
|  |  | Total | % by weight | 100.0 | 100.0 | 100.0 | 100.0 | 100.0 | 100.0 |

|  |  |  | Unit | Example 7 | Example 8 | Example 9 | Example 10 | Example 11 | Example 12 |
|---|---|---|---|---|---|---|---|---|---|
| Raw material | Glass flakes | Average particle diameter | μm | 250 | 250 | 250 | 50 | 140 | 600 |
|  |  | Average thickness | μm | 0.5 | 0.5 | 6.0 | 1.5 | 1.5 | 1.5 |
|  |  | Content (based on total amount of silica fine powder and glass flakes) | % by weight | 7.0 | 3.0 | 12.0 | 7.0 | 7.0 | 7.0 |
|  | Mixing amount | Polyethylene resin | part by weight | 1000 | 1000 | 1000 | 1000 | 1000 | 1000 |
|  |  | Silica fine powder | part by weight | 2412 | 2516 | 2282 | 2412 | 2412 | 2412 |
|  |  | Glass flakes | part by weight | 182 | 78 | 311 | 182 | 182 | 182 |
|  |  | Paraffin mineral oil | part by weight | 4993 | 5208 | 4724 | 4993 | 4993 | 4993 |
|  |  | Surfactant | part by weight | 109 | 109 | 109 | 109 | 109 | 109 |
|  |  | Silane coupling agent | part by weight | 0 | 0 | 0 | 0 | 0 | 0 |
|  |  | Total | part by weight | 8696 | 8911 | 8426 | 8696 | 8696 | 8696 |
|  | Mixing ratio | Polyethylene resin | % by weight | 11.5 | 11.2 | 11.9 | 11.5 | 11.5 | 11.5 |
|  |  | Silica fine powder | % by weight | 27.7 | 28.2 | 27.1 | 27.7 | 27.7 | 27.7 |
|  |  | Glass flakes | % by weight | 2.1 | 0.9 | 3.7 | 2.1 | 2.1 | 2.1 |
|  |  | Paraffin mineral oil | % by weight | 57.4 | 58.5 | 56.0 | 57.4 | 57.4 | 57.4 |
|  |  | Surfactant | % by weight | 1.3 | 1.2 | 1.3 | 1.3 | 1.3 | 1.3 |
|  |  | Silane coupling agent | % by weight | 0 | 0 | 0 | 0 | 0 | 0 |
|  |  | Total | % by weight | 100.0 | 100.0 | 100.0 | 100.0 | 100.0 | 100.0 |

|  |  |  | Unit | Example 1 | Example 2 | Example 3 | Example 4 |
|---|---|---|---|---|---|---|---|
| Separator | Glass flakes | Average particle diameter of particles having particle diameter of 10 μm or more | μm | 125 | 125 | 125 | 125 |

TABLE 1-continued

|  |  |  |  | | | | |
|---|---|---|---|---|---|---|---|
|  |  | Average thickness | μm | 1.5 | 1.5 | 1.5 | 1.5 |
|  |  | Content/average thickness | — | 1.2 | 2.7 | 4.7 | 2.7 |
|  |  | Dispersion uniformity    Silica fine powder | — | good | good | good | very good |
|  |  |                          Glass flakes | — | good | good | good | very good |
|  |  | Orientation and   Flake plane direction and film plane | — | nearly same direction | nearly same direction | nearly same direction | nearly same direction |
|  |  | angle             direction |  |  |  |  |  |
|  |  | Proportion of particles having particle diameter of 10 μm or more having flake plane forming 20° or less to film plane | % | 100 | 100 | 100 | 100 |
|  |  | Proportion of particles having particle diameter of 10 μm or more having flake plane forming 10° or less to film plane | % | 95 | 95 | 95 | 95 |
|  | Composition ratio | Polyethylene resin | % by weight | 22.9 | 22.9 | 22.9 | 22.8 |
|  |  | Silica fine powder | % by weight | 57.5 | 55.2 | 52.2 | 54.9 |
|  |  | Glass flakes | % by weight | 1.8 | 4.1 | 7.1 | 4.1 |
|  |  | Paraffin mineral oil | % by weight | 16.0 | 16.0 | 16.0 | 16.0 |
|  |  | Surfactant | % by weight | 1.8 | 1.8 | 1.8 | 1.8 |
|  |  | Silane coupling agent | % by weight | 0 | 0 | 0 | 0.4 |
|  |  | Total | % by weight | 100.0 | 100.0 | 100.0 | 100.0 |
|  | Characteristics | Base thickness | mm | 0.20 | 0.20 | 0.20 | 0.20 |
|  | Tensile strength  MD | | MPa | 49.7 | 53.5 | 56.5 | 54.1 |
|  |                   CD | | MPa | 10.3 | 10.4 | 10.7 | 10.5 |
|  | Elongation        MD | | % | 52 | 45 | 40 | 42 |
|  |                   CD | | % | 630 | 630 | 610 | 640 |
|  |  | Porosity | % by volume | 60 | 58 | 53 | 58 |
|  |  | Average pore diameter | μm | 0.09 | 0.09 | 0.09 | 0.09 |
|  |  | Maximum pore diameter | μm | 0.65 | 0.65 | 0.65 | 0.65 |
|  |  | Permeability | second | 21 | 22 | 23 | 24 |
|  |  | Electric resistance | Ω · 100 cm²/sheet | 0.0010 | 0.0011 | 0.0012 | 0.0010 |
|  |  | Oxidation resistance lifetime | % | 110 | 130 | 150 | 150 |
|  |  | Dendrite short circuit characteristics | % | 130 | 140 | 140 | 140 |

| | | | | Example | | | |
|---|---|---|---|---|---|---|---|
| | | | Unit | 5 | 6 | 7 | 8 |
| Separator | Glass flakes | Average particle diameter of particles having particle diameter of 10 μm or more | μm | 125 | 125 | 40 | 40 |
|  |  | Average thickness | μm | 1.5 | 1.5 | 0.5 | 0.5 |
|  |  | Content/average thickness | — | 2.7 | 4.7 | 8.2 | 3.4 |
|  |  | Dispersion uniformity    Silica fine powder | — | very good | very good | good | good |
|  |  |                          Glass flakes | — | very good | very good | good | good |
|  |  | Orientation and   Flake plane direction and film plane | — | nearly same direction | nearly same direction | nearly same direction | nearly same direction |
|  |  | angle             direction |  |  |  |  |  |
|  |  | Proportion of particles having particle diameter of 10 μm or more having flake plane forming 20° or less to film plane | % | 100 | 100 | 95 | 95 |
|  |  | Proportion of particles having particle diameter of 10 μm or more having flake plane forming 10° or less to film plane | % | 95 | 95 | 90 | 90 |
|  | Composition ratio | Polyethylene resin | % by weight | 22.4 | 22.4 | 22.9 | 22.9 |
|  |  | Silica fine powder | % by weight | 54.1 | 51.2 | 55.2 | 57.6 |
|  |  | Glass flakes | % by weight | 4.1 | 7.0 | 4.1 | 1.7 |
|  |  | Paraffin mineral oil | % by weight | 16.0 | 16.0 | 16.0 | 16.0 |
|  |  | Surfactant | % by weight | 1.8 | 1.8 | 1.8 | 1.8 |
|  |  | Silane coupling agent | % by weight | 1.6 | 1.6 | 0 | 0 |
|  |  | Total | % by weight | 100.0 | 100.0 | 100.0 | 100.0 |
|  | Characteristics | Base thickness | mm | 0.20 | 0.20 | 0.20 | 0.20 |
|  | Tensile strength  MD | | MPa | 53.4 | 53.2 | 58.5 | 57.0 |
|  |                   CD | | MPa | 10.7 | 10.4 | 11.2 | 10.9 |
|  | Elongation        MD | | % | 45 | 42 | 40 | 40 |
|  |                   CD | | % | 650 | 640 | 610 | 610 |
|  |  | Porosity | % by volume | 58 | 53 | 58 | 59 |
|  |  | Average pore diameter | μm | 0.09 | 0.09 | 0.09 | 0.09 |
|  |  | Maximum pore diameter | μm | 0.65 | 0.65 | 0.65 | 0.65 |
|  |  | Permeability | second | 26 | 26 | 24 | 22 |
|  |  | Electric resistance | Ω · 100 cm²/sheet | 0.0011 | 0.0011 | 0.0011 | 0.0010 |
|  |  | Oxidation resistance lifetime | % | 150 | 150 | 130 | 110 |
|  |  | Dendrite short circuit characteristics | % | 140 | 150 | 140 | 140 |

TABLE 1-continued

|  |  |  |  | Unit | Example 9 | Example 10 | Example 11 | Example 12 |
|---|---|---|---|---|---|---|---|---|
| Separator | Glass flakes | Average particle diameter of particles having particle diameter of 10 μm or more | | μm | 140 | 50 | 115 | 150 |
| | | Average thickness | | μm | 6.0 | 1.5 | 1.5 | 1.5 |
| | | Content/average thickness | | — | 1.2 | 2.7 | 2.7 | 2.7 |
| | | Dispersion uniformity | Silica fine powder | — | good | good | good | good |
| | | | Glass flakes | — | good | good | good | good |
| | Orientation and angle | Flake plane direction and film plane direction | | — | nearly same direction | nearly same direction | nearly same direction | nearly same direction |
| | | Proportion of particles having particle diameter of 10 μm or more having flake plane forming 20° or less to film plane | | % | 95 | 95 | 100 | 100 |
| | | Proportion of particles having particle diameter of 10 μm or more having flake plane forming 10° or less to film plane | | % | 90 | 90 | 95 | 95 |
| | Composition ratio | Polyethylene resin | | % by weight | 22.9 | 22.9 | 22.9 | 22.9 |
| | | Silica fine powder | | % by weight | 52.2 | 55.2 | 55.2 | 55.2 |
| | | Glass flakes | | % by weight | 7.1 | 4.1 | 4.1 | 4.1 |
| | | Paraffin mineral oil | | % by weight | 16.0 | 16.0 | 16.0 | 16.0 |
| | | Surfactant | | % by weight | 1.8 | 1.8 | 1.8 | 1.8 |
| | | Silane coupling agent | | % by weight | 0 | 0 | 0 | 0 |
| | | Total | | % by weight | 100.0 | 100.0 | 100.0 | 100.0 |
| Characteristics | | Base thickness | | mm | 0.20 | 0.20 | 0.20 | 0.20 |
| | Tensile strength | MD | | MPa | 51.0 | 52.8 | 53.7 | 53.5 |
| | | CD | | MPa | 10.5 | 10.1 | 10.2 | 10.5 |
| | Elongation | MD | | % | 40 | 45 | 45 | 42 |
| | | CD | | % | 620 | 610 | 620 | 620 |
| | Porosity | | | % by volume | 53 | 58 | 58 | 58 |
| | Average pore diameter | | | μm | 0.09 | 0.09 | 0.09 | 0.09 |
| | Maximum pore diameter | | | μm | 0.65 | 0.65 | 0.65 | 0.65 |
| | Permeability | | | second | 22 | 22 | 22 | 22 |
| | Electric resistance | | | $\Omega \cdot 100\ cm^2$/sheet | 0.0012 | 0.0012 | 0.0011 | 0.0011 |
| | Oxidation resistance lifetime | | | % | 150 | 130 | 130 | 130 |
| | Dendrite short circuit characteristics | | | % | 130 | 140 | 140 | 130 |

TABLE 2

|  |  |  |  | Unit | Comparative Example 1 | 2 | 3 | 4 | 5 | 6 | Reference Example |
|---|---|---|---|---|---|---|---|---|---|---|---|
| Raw material | Glass flakes | Average particle diameter | | μm | 250 | 250 | 250 | 250 | 10 | 1000 | — |
| | | Average thickness | | μm | 1.5 | 1.5 | 1.5 | 10.0 | 1.5 | 1.5 | — |
| | | Content (based on total amount of silica fine powder and glass flakes) | | % by weight | 1.0 | 20.0 | 7.0 | 12.0 | 15.0 | 7.0 | — |
| | Mixing amount | Polyethylene resin | | part by weight | 1000 | 1000 | 1000 | 1000 | 1000 | 1000 | 1000 |
| | | Silica fine powder | | part by weight | 2568 | 2075 | 2412 | 2282 | 2210 | 2412 | 2590 |
| | | Glass flakes | | part by weight | 26 | 519 | 182 | 311 | 390 | 182 | 0 |
| | | Paraffin mineral oil | | part by weight | 5316 | 4295 | 4993 | 4724 | 4580 | 4993 | 5380 |
| | | Surfactant | | part by weight | 109 | 109 | 109 | 109 | 109 | 109 | 109 |
| | | Silane coupling agent | | part by weight | 0 | 0 | 315 | 0 | 0 | 0 | 0 |
| | | Total | | part by weight | 9019 | 7998 | 9011 | 8426 | 8289 | 8696 | 9079 |
| | Mixing ratio | Polyethylene resin | | % by weight | 11.1 | 12.5 | 11.1 | 11.9 | 12.1 | 11.5 | 11.0 |
| | | Silica fine powder | | % by weight | 28.5 | 25.9 | 26.8 | 27.1 | 26.7 | 27.7 | 28.5 |
| | | Glass flakes | | % by weight | 0.3 | 6.5 | 2.0 | 3.7 | 4.7 | 2.1 | 0.0 |
| | | Paraffin mineral oil | | % by weight | 58.9 | 53.7 | 55.4 | 56.0 | 55.2 | 57.4 | 59.3 |
| | | Surfactant | | % by weight | 1.2 | 1.4 | 1.2 | 1.3 | 1.3 | 1.3 | 1.2 |
| | | Silane coupling agent | | % by weight | 0 | 0 | 3.5 | 0 | 0 | 0 | 0 |
| | | Total | | % by weight | 100.0 | 100.0 | 100.0 | 100.0 | 100.0 | 100.0 | 100.0 |

|  |  |  | Unit | Comparative Example 1 | 2 | 3 | 4 |
|---|---|---|---|---|---|---|---|
| Separator | Glass flakes | Average particle diameter of particles having particle diameter of 10 μm or more | μm | 125 | 130 | 125 | 145 |
| | | Average thickness | μm | 1.5 | 1.5 | 1.5 | 10.0 |
| | | Content/average thickness | — | 0.4 | 7.9 | 2.5 | 0.7 |

TABLE 2-continued

|  |  |  |  | | | | |
|---|---|---|---|---|---|---|---|
| | Dispersion uniformity | Silica fine powder | — | good | good | very good | good |
| | | Glass flakes | — | good | good | very good | good |
| | Orientation and angle | Flake plane direction and film plane direction | — | nearly same direction | nearly same direction | nearly same direction | slightly same direction |
| | | Proportion of particles having particle diameter of 10 μm or more having flake plane forming 20° or less to film plane | % | 100 | 100 | 100 | 95 |
| | | Proportion of particles having particle diameter of 10 μm or more having flake plane forming 10° or less to film plane | % | 95 | 95 | 95 | 90 |
| Composition ratio | | Polyethylene resin | % by weight | 22.9 | 22.9 | 21.0 | 22.9 |
| | | Silica fine powder | % by weight | 58.7 | 47.4 | 50.8 | 52.2 |
| | | Glass flakes | % by weight | 0.6 | 11.9 | 3.8 | 7.1 |
| | | Paraffin mineral oil | % by weight | 16.0 | 16.0 | 16.0 | 16.0 |
| | | Surfactant | % by weight | 1.8 | 1.8 | 1.8 | 1.8 |
| | | Silane coupling agent | % by weight | 0 | 0 | 6.6 | 0 |
| | | Total | % by weight | 100.0 | 100.0 | 100.0 | 100.0 |
| Characteristics | | Base thickness | mm | 0.20 | 0.20 | 0.20 | 0.20 |
| | Tensile strength | MD | MPa | 32.5 | 58.4 | 52.5 | 54.0 |
| | | CD | MPa | 9.1 | 11.8 | 10.3 | 10.7 |
| | Elongation | MD | % | 68 | 43 | 45 | 45 |
| | | CD | % | 670 | 610 | 620 | 630 |
| | | Porosity | % by volume | 61 | 50 | 58 | 53 |
| | | Average pore diameter | μm | 0.09 | 0.09 | 0.09 | 0.09 |
| | | Maximum pore diameter | μm | 0.65 | 0.65 | 0.65 | 0.65 |
| | | Permeability | sec | 21 | 29 | 35 | 22 |
| | | Electric resistance | Ω · 100 cm²/sheet | 0.0010 | 0.0016 | 0.0016 | 0.0012 |
| | | Oxidation resistance lifetime | % | 100 | 170 | 130 | 130 |
| | | Dendrite short circuit characteristics | % | 100 | 150 | 140 | 110 |

| | | | | Comparative Example | | Reference |
|---|---|---|---|---|---|---|
| | | | Unit | 5 | 6 | Example |
| Separator | Glass flakes | Average particle diameter of particles having particle diameter of 10 μm or more | μm | 10 | 180 | — |
| | | Average thickness | μm | 1.5 | 1.5 | — |
| | | Content/average thickness | — | 5.9 | 2.7 | — |
| | Dispersion uniformity | Silica fine powder | — | good | good | — |
| | | Glass flakes | — | good | slightly good | — |
| | Orientation and angle | Flake plane direction and film plane direction | — | slightly same direction | nearly same direction | — |
| | | Proportion of particles having particle diameter of 10 μm or more having flake plane forming 20° or less to film plane | % | 85 | 95 | — |
| | | Proportion of particles having particle diameter of 10 μm or more having flake plane forming 10° or less to film plane | % | 80 | 90 | — |
| Composition ratio | | Polyethylene resin | % by weight | 22.8 | 22.9 | 22.9 |
| | | Silica fine powder | % by weight | 50.5 | 55.2 | 59.3 |
| | | Glass flakes | % by weight | 8.9 | 4.1 | 0.0 |
| | | Paraffin mineral oil | % by weight | 16.0 | 16.0 | 16.0 |
| | | Surfactant | % by weight | 1.8 | 1.8 | 1.8 |
| | | Silane coupling agent | % by weight | 0 | 0 | 0 |
| | | Total | % by weight | 100.0 | 100.0 | 100.0 |
| Characteristics | | Base thickness | mm | 0.20 | 0.20 | 0.20 |
| | Tensile strength | MD | MPa | 55.0 | 53.8 | 27.5 |
| | | CD | MPa | 11.0 | 10.5 | 8.6 |
| | Elongation | MD | % | 45 | 43 | 75 |
| | | CD | % | 620 | 620 | 650 |
| | | Porosity | % by volume | 51 | 58 | 62 |
| | | Average pore diameter | μm | 0.09 | 0.09 | 0.09 |
| | | Maximum pore diameter | μm | 0.65 | 0.65 | 0.65 |
| | | Permeability | sec | 23 | 26 | 20 |
| | | Electric resistance | Ω · 100 cm²/sheet | 0.0016 | 0.0011 | 0.0010 |
| | | Oxidation resistance lifetime | % | 140 | 130 | 100 |
| | | Dendrite short circuit characteristics | % | 140 | 110 | 100 |

The following may be understood from the results shown in Tables 1 and 2.

(1) In the separators of Examples 1 to 12 of the invention as compared to the separator of Reference Example, the tensile strength in MD is from 49.7 to 58.5 MPa, which is enhanced therefrom, the tensile strength in CD is from 10.1 to 11.2 MPa, which is equivalent thereto or better, the elongation in CD is from 610 to 650%, which is nearly equivalent thereto, the elongation in MD is from 40 to 52%, which is slightly lowered but is in a level causing no problem as a separator for a lead-acid battery, the average pore diameter is 0.09 μm, which is equivalent thereto, and the maximum pore diameter is 0.65 μm, which is equivalent thereto, whereas a part of the silica fine powder having numerous fine pores and a large surface area is replaced by the glass flakes, whereby the porosity is from 53 to 60% by volume, which is slightly lowered therefrom, the permeability is from 21 to 26 seconds, which is slightly lowered therefrom, and the electric resistance is from 0.0010 to 0.0012 Ω·100 cm²/sheet, which is slightly increased therefrom, but a part of the silica fine powder is replaced by the glass flakes to achieve the effective reinforcing effect on the polyethylene resin base material with the flaky inorganic material, whereby the oxidation resistance lifetime is from 110 to 150%, which is enhanced therefrom, and the suitable amount of the glass flakes having an average particle diameter of from 50 to 600 μm and an average thickness of from 0.5 to 6.0 μm are added by replacing a part of the silica fine powder, and the suitable amount of the glass flakes having an average particle diameter (for the particles that have a particle diameter of 10 μm or more) of from 40 to 150 μm and an average thickness of from 0.5 to 6.0 μm are disposed in a uniformly dispersed state in the microporous film in such a manner that the plane direction thereof is substantially oriented in a plane direction of the microporous film, whereby the dendrite short circuit characteristics are from 130 to 150%, which is improved therefrom. Accordingly, in the case where the separators of Examples 1 to 12 of the invention are applied to an automobile lead-acid battery that is used under the particular use conditions of the battery (in which the battery undergoes repeated charge and discharge without full charge, and tends to be in a rather discharged state), such as an automobile with a charge controlling system and an automobile with a start-stop system, the separators prevent dendrite short circuit from occurring, and contribute to the prevention of the reduction of the battery lifetime caused by the phenomenon that dendrite short circuit occurs simultaneously in plural positions.

(2) In the separator of Comparative Example 1, the amount of the glass flakes based on the total amount of the silica fine powder and the glass flakes in the raw material composition and the microporous film is as small as 1.0% by weight, whereby as compared to the separator of Reference Example, the deterioration of the electric resistance can be avoided, but the dendrite short circuit characteristics are not improved.

(3) In the separator of Comparative Example 2, the amount of the glass flakes based on the total amount of the silica fine powder and the glass flakes in the raw material composition and the microporous film is as large as 20.0% by weight, whereby as compared to the separator of Reference Example, the dendrite short circuit characteristics are largely improved to 150%, but the electric resistance is largely deteriorated to 0.0016 Ω·100 cm²/sheet.

(4) In the separator of Comparative Example 3, the content of the silane coupling agent in the raw material composition is as large as 3.5% by weight, whereby as compared to the separator of Reference Example, the permeability is largely lowered to 35 seconds, and the electric resistance is largely deteriorated to 0.0016 Ω·100 cm²/sheet.

(5) In the separator of Comparative Example 4, the average thickness of the glass flakes in the raw material composition and the microporous film is as large as 10.0 μm, whereby as compared to the separator of Reference Example, the improvement of the dendrite short circuit characteristics ends at 110%, although the amount of the glass flakes based on the total amount of the silica fine powder and the glass flakes in the raw material composition and the microporous film is increased to 12.0% by weight.

(6) In the separator of Comparative Example 5, the average particle diameter of the glass flakes (for the particles that have a particle diameter of 10 μm or more) in the raw material composition and the microporous film is as small as 10 μm, whereby as compared to the separator of Reference Example, the dendrite short circuit characteristics are improved to 140%, but the electric resistance is largely deteriorated to 0.0016 Ω·100 cm²/sheet, although the amount of the glass flakes based on the total amount of the silica fine powder and the glass flakes in the raw material composition and the microporous film is increased to 15.0% by weight, which also results in the reduction of the tendency that the plane direction of the glass flakes in the microporous film is substantially oriented in a plane direction of the microporous film.

(7) In the separator of Comparative Example 6, the average particle diameter of the glass flakes in the raw material composition is as large as 1,000 μm, and the average particle diameter of the glass flakes (for the particles that have a particle diameter of 10 μm or more) in the microporous film is 180 μm, resulting in reduction of the dispersion uniformity of the glass flakes (for the primary particles that have a particle diameter of 10 μm or more) in the microporous film, whereby as compared to the separator of Reference Example, the improvement of the dendrite short circuit characteristics ends at 110%.

The invention claimed is:

1. A separator for a lead-acid battery, comprising:
a microporous film having a base thickness of from 0.1 to 0.3 mm, an average pore diameter (mercury intrusion method) of from 0.01 to 0.5 μm, a maximum pore diameter (mercury intrusion method) of from 0.3 to 1.0 μm, and a porosity (mercury intrusion method) of from 50 to 90% by volume,
wherein the micoporous film is obtained by melt-kneading and forming into a film a raw material composition mainly containing a polyolefin resin, silica powder, and a plasticizer and further containing glass flakes having an average particle diameter of from 20 to 800 μm and an average thickness of 0.2 to 8 μm in an amount of from 2 to 15% by weight based on a total amount of the silica powder and the glass flakes, and a silane coupling agent (solid content) in a content of from 0 to 3% by weight, such that the plasticizer is entirely or partially removed from the film,
wherein the glass flakes have no self-film formability, wherein self-film formability is the property that when only the glass flakes are dispersed in water to form a dispersion liquid having an appropriate concentration, which is coated on a surface of a base material having smoothness and then solidified by drying, the glass flakes form a film by themselves,
wherein the microporous film has a total content of the polyolefin resin, the silica powder, the plasticizer, and the glass flakes of 90% by weight or more, a content of the polyolefin resin of from 20 to 60% by weight, a content of the silica powder of from 40 to 80% by weight, and a content of the plasticizer of from 0 to 30% by weight, and an amount of the glass flakes therein being from 2 to 15% by weight based on a total amount of the silica powder and the glass flakes,
the glass flakes in the microporous film have an average thickness of from 0.2 to 8μm,
the glass flake particles in the microporous film that have a particle diameter of 10 μm or more are disposed in such a manner that a plane direction thereof is substantially oriented in a plane direction of the microporous film, and a value of (the content of the glass flakes in the microporous film (% by weight))/(the average thickness of the glass flakes in the microporous film (μm)) is 1(%/μm) or more.

2. The separator for a lead-acid battery according to claim 1, wherein the value of (the content of the glass flakes in the microporous film (% by weight))/(the average thickness of the glass flakes in the microporous film (μm)) is 2(%/μm) or more.

3. The separator for a lead-acid battery according to claim 1, wherein 80% or more of the particles that have a particle diameter of 10 μm or more of the glass flakes in the microporous film are disposed in such a manner that a plane direction thereof forms 20° or less with respect to the plane direction of the microporous film.

4. The separator for a lead-acid battery according to claim 1, wherein the raw material composition contains the silane coupling agent (solid content) in a content of from 0.1% by weight or more.

5. The separator for a lead-acid battery according to claim 1, wherein the glass flakes in the raw material composition and the microporous film have an average thickness of 2 μm or less, the amount of the glass flakes in the raw material composition is from 2 to 8% by weight based on the total amount of the silica powder and the glass flakes, the amount of the glass flakes in the microporous film is from 2 to 8% by weight based on the total amount of the silica powder and the glass flakes, and the value of (the content of the glass flakes in the microporous film (% by weight))/(the average thickness of the glass flakes in the microporous film (μm)) is 10(%/μm) or less.

6. A lead-acid battery comprising the separator according to claim 1.

* * * * *